United States Patent
Degertekin et al.

(10) Patent No.: US 7,312,440 B2
(45) Date of Patent: Dec. 25, 2007

(54) INTEGRATED MICRO FUEL PROCESSOR AND FLOW DELIVERY INFRASTRUCTURE

(75) Inventors: F. Levent Degertekin, Decatur, GA (US); Andrei G. Fedorov, Atalnta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 790 days.

(21) Appl. No.: 10/756,915

(22) Filed: Jan. 13, 2004

(65) Prior Publication Data

US 2004/0192044 A1 Sep. 30, 2004

Related U.S. Application Data

(60) Provisional application No. 60/440,012, filed on Jan. 14, 2003.

(51) Int. Cl.
*B01D 59/44* (2006.01)
*B01D 15/08* (2006.01)
*B05B 5/00* (2006.01)

(52) U.S. Cl. .................. 250/281; 250/288; 250/428; 250/435

(58) Field of Classification Search ............ None
See application file for complete search history.

(56) References Cited

U.S. PATENT DOCUMENTS

| | | | |
|---|---|---|---|
| 3,983,740 A | 10/1976 | Francois | |
| 6,228,147 B1 | 5/2001 | Takahashi | 95/55 |
| 6,474,786 B2 | 11/2002 | Percin et al. | 347/54 |
| 6,541,676 B1 | 4/2003 | Franz et al. | 585/250 |
| 7,208,727 B2* | 4/2007 | Fedorov et al. | 250/287 |
| 2003/0111599 A1 | 6/2003 | Staats | |
| 2007/0080246 A1* | 4/2007 | Fedorov et al. | 239/690.1 |

FOREIGN PATENT DOCUMENTS

WO    WO 01/96019    12/2001

OTHER PUBLICATIONS

Kikas, et al.; Hydrogen Production in a Reverse-Flow Autothermal Catalytic Microreactor: From Evidence of Performance Enhancement to Innovative Reactor Design; Ind. Eng. Chem. Res., vol. 42, No. 25; pp. 6273-6279.

Kikas, et al.; Hydrogen Production in the Reverse-Flow Autothermal Catalytic Microreactor; 7th Int. Conference on Microreaction Technology; Switzerland, Sep. 2003; pp. 1-3.

(Continued)

*Primary Examiner*—Nikita Wells
(74) *Attorney, Agent, or Firm*—Thomas, Kayden, Horstemeyer & Risley, LLP

(57) ABSTRACT

Apparatus for transporting a fluid, atomizers, reactors, integrated fuel processing apparatus, combinations thereof, methods of atomizing reactants, methods of moving fluids, methods of reverse-flow in a reactor, and combinations thereof, are provided. One exemplary apparatus for transporting a fluid, among others, includes: a channel for receiving a fluid; a sensor for determining an internal condition of the fluid in the channel; and a channel actuator in communication with the sensor for changing a cross-sectional area of the channel based on the internal condition, wherein the change in cross-sectional area controls a parameter selected from a pressure and a fluid flow.

25 Claims, 25 Drawing Sheets

OTHER PUBLICATIONS

Kikas; et al.; Feedstock for Micro Fuel Cells: Efficient Hydrogen Production in the Reverse-Flow Autothermal Catalytic Microreactors with Fractal Structuring of the Catalytically Active Surface; Int. Synposium on Micro/Nano Scale Energy Conversion, Turkey, Apr. 2002; 3 pages.

Meacham; et al.; A Micromachined Ultrasonic Droplet Generator Based on a Liquid Horn Structure; Review of Scientific Instruments (submitted on Sep. 25, 2003); pp. 1-17.

Phillips, et al.; Catalysts Surface At a Fractal of Cost—A Quest for Optimal Loading; Chemical Engineering Science, No. 58; 2003; pp. 2403-2408.

Presentation to Prospective Sponsors; Oct. 2003.

Klavs F. Jensen; Microreaction Engineering-Is Small Better?: Chemical Engineering Science, No. 56; 2001; pp. 293-3003.

Karnik, et al.; Towards a Palladium Micro-Membrane for the Water Gas Shift Reaction: Microfabrication Approach and Hydrogen Purification Results; Journal of Microelectromechanical Systems, vol. 12, No. 1; Feb. 2003; pp. 93-100.

Shu, et al.; Catalytic Palladium-Based Membrane Reactors: A Review; The Canadian Journal of Chemical Engineering, vol. 69, Oct. 1991; pp. 1036-1058.

Edwards, et al.; On-Board Hydrogen Generation For Transport Applications: the HotSpot™ Methanol Processor; Journal of Power Sources, No. 71; 1998; pp. 123-128.

Irving, et al.; Novel Catalytic Fuel Reforming with Advanced Membrane Technology; Proceedings of the 2001 DOE Hydrogen Program Review; NREL/CP-570-30535; 9 pages.

Han, et al.; Purifier-Integrated Methanol Reformer for Fuel Cell Vehicles; Journal of Power Sources, No. 86; 2000; pp. 223-227.

Kothare, et al.; An Integrated Chemical Reforming Microplant for Fuel Cell Applications; Integrated Microchemical Systems Laboratory, Lehigh University; Presentation from NSF website in 2002; 14 pages.

Quiram, et al.; Design Issues for Membrane-Based, Gas Phase Microchmical Systems; Chemical Engineering Sciences No. 55; 2000, pp. 3065-3075.

Hsing, et al.; Simulation of Micromachined Chemical Reactors for Heterogeneous Partial Oxidation Reactions; Chemical Engineering Science, No. 55; 2000; pp. 3-13.

Tonkovich, et al.; Microchannel Reactors for Fuel Processing Applications. I. Water Gas Shift Reactor; Chemical Engineering Science, No. 54; 1999; pp. 2947-2951.

Fitzgerald, et al.; A Compact Steam Reforming Reactor For Use In An Automative Fuel Processor; Proceedings of the Fourth International Conference on Microreaction Technology. 358-363. Atlanta, GA, 2000; pp. 1-5.

Tonkovich, et al.; The Catalytic Partial Oxidation of Methane in a Microchannel Chemical Reactor; Proceedings of the Second International Conference of Microreaction Technology, Mar. 1998, New Orleans, Louisiana; 11 pages.

Srinivasan, et al.; Chemical Performance and High Temperature Characterization of Micromachined Chemical Reactors; Transducers '97; 1997 International Conference on Solid-State Sensors and Actuators, Chincago, Jun. 16-19, 1997; pp. 163-166.

Hsing, et al.; Simulation of Micromachined Chemical Reactors For Heterogeneous Partial Oxidation Reactions; Chemical Engineering Science, No. 55; 2000; pp. 3-13.

Blanks, et al.; Bidirectional Adiabatic Synthesis Gas Generator; Chemical Engineering Science, vol. 45, No. 8; 1990; pp. 2407-2413.

Ajmera, et al.; A Novel Cross-Flow Microreactor for Kinetic Studies of Catalytic Processes; Presented at the 5th International Microreactor Engineering and Technology Conference, May 2001; 10 pages.

Ben-Tullilah, et al.; Flow-Rate Effects in Flow-Reversal Reactors; Experiments, Simulations and Approximations; Chemical Engineering Science, vol. 58; 2003; pp. 1135-1146.

Yurii Sh. Matros; Forced Unsteady-State Processes in Heterogeneous Catalytic Reactors; The Canadian Journal of Chemical Engineering, vol. 74; Oct. 1996; pp. 566-579.

Arana, et al.; A Microfabricated Suspended-Tube Chemical Reactor for Thermally-Efficient Fuel Processing; REC. Jul. 9, 2002; JMEMS, 0900; pp. 1-31.

Success in R&D of Optical, Small-Scale, High-Performance Fuel Cells for Portable Devices; Mar. 13, 2002; http://www.casio.com/corporate/pressroom.cfm?act=2&pr=553.

Meacham, et al.; A Micromachined Ultrasonic Droplet Generator Based on a Liquid Horn Structure; Review of Scientific Instruments (Accepted); Submitted in Oct. 2003; pp. 1-17.

Yuan, et al.; MEMS-Based Piezoelectric Array Microjet; Microelectronic Engineering, No.; 66; 2003; pp. 767-772.

Brenn, et al.; Drop Formation From a Vibrating Orifice Generator Driven by Modulated Electrical Signals; Phys. Fluids, No. 9 (12); Dec. 1997; pp. 3658-3669.

Paul calvert; Inkjet Printing for Materials and Devices; Chem. Mater., vol. 13; 2001; pp. 3299-3305.

Calvert, et al.; Chemical Solid Free-Form Fabrication: Making Shapes Without Molds; Chm. Mater., vol. 9; 1997; pp. 650-663.

Chen, et al.; A New Method For Significantly Reducing Drop Radius Without Reducing Nozzle Radius in Drop-On-Demand Drop Production; Physics of Fluids, vol. 14, No. 1; Jan. 2002; pp. L1-L4.

Heji, etal.; Characterisation of a fL Droplet generator For Inhalation Drug Therapy; Sensors and Actuators, vol. 85; 2000; pp. 430-434.

Elrod, et al.; Nozzleless Droplet Formation With Focused Acoustic Beams; J. Appl. Phys. vol. 65 (I); May 1, 1989; pp. 3341-3447.

Percin, et al.; Micromachined Droplet Ejector Arrays; Review of Scientific Instruments, vol. 73, No. 12; Dec. 2002; pp. 4385-4389.

Percin, et al.; Piezoelectrically Actuated Flextensional Micromachined Ultrasound Droplet Ejectors; IEEE Translations on Ultrasonics, Ferroelectrics, and Frequency Control, vol. 49, No. 6; Jun. 2002; pp. 756-766.

Percin, et al.; Piezoeletric Droplet Ejector For Ink-Jet Printing of Fluids and Solid Particles; Review of Scientific Instruments, vol. 74, No. 2; Feb. 2003; pp. 1120-1127.

Ridley, et al.; All-Inorganic Field Effect Transistors Fabricated By Printing; SCIENCE, vol. 286; Oct. 22, 1999; pp. 746-749.

Tsai, et al.; The Role of Capillary Waves in Two-Fluid Atomization; Physc. Fluids, vol. 9, (10); Oct. 1997; pp. 2909-2918.

Hue P. Le; Progress and Trends in Ink-Jet Printing Technology; Journal of Imaging Science and Technology, vol. 42, No. 1; Jan./Feb. 1998; pp. 49-62.

Oennerfjord P et al: "Picoliter Sample Preparation in Maidi-Tof MS Using a Micromachined Silicon Flow-Through Dispenser"; Analytical Chemistry, American Chemical Society, Columbus, US, vol. 70, No. 22, Nov. 15, 1998, pp. 4755-4760.

European search report dated Jul. 11, 2007.

* cited by examiner

INTEGRATED MICRO FUEL PROCESSOR AND FLOW DELIVERY INFRASTRUCTURE

CROSS-REFERENCE TO RELATED APPLICATIONS

This application claims the benefit under 35 U.S.C. § 119(e) to U.S. Provisional Patent Application Ser. No. 60/440,012, entitled "INTEGRATED MICRO FUEL PROCESSOR FOR HYDROGEN PRODUCTION AND PORTABLE POWER GENERATION" filed on Jan. 14, 2003 in the name of Andrei G. Fedorov and F. Levent Degertekin, the entirety of which is hereby incorporated by reference.

FIELD OF THE INVENTION

The present disclosure relates generally to hydrogen production and electrical current producing apparatus, product, and processes, and relates more particularly, to fuel generating systems, components used therewith, and methods of operating the same.

BACKGROUND

Portable electronic devices, such as handheld computers, laptops, and wireless telephones, are proliferating rapidly for a wide variety of consumer, business and military applications. As their use continues to expand, consumers of all types desire longer power-on times and a continuously expanding set of functions for them. In order to accommodate this, a corresponding increase in the demand for portable electrical power generation and supply needs to be met.

The limited size of these devices places a limit on the size of batteries that can be used to power them. This, in turn, places a natural limit on the amount of power conventional batteries can produce. In order to overcome this potential shortfall in portable power for the future, other sources of power generation for portable electronic devices have to be pursued.

Electrochemical fuel cells have a well-recognized potential to revolutionize energy production, for both large-scale and small-scale applications. However, as is well known, this potential cannot be realized until simple, cheap and energy efficient means for hydrogen fuel production becomes available. To this end, recent advances in microfabrication have led to the development of compact chemical micro-reactors for various small-scale applications, such as on-demand production of hydrogen or other chemical fuels useful for portable fuel cell technologies. In addition to the favorable properties of rapid heat and mass transport, the miniaturization of chemical reactors offers higher productivity rates due to the fast, non-equilibrium surface chemistry properties of the miniaturized reactor.

The above-mentioned size limitations pertinent to portable electronics, coupled with the attractive potential for process intensification associated with micro-scale technologies, led to several attempts to design, fabricate, and test micro-machined chemical reactors for portable hydrogen fuel generation. The most notable examples are those from the Pacific Northwest National Laboratory (PNNL), Motorola Energy Technology Labs, Sanyo Corp., Lehigh University, and Innovatek, Inc. These groups each focused on single reaction systems that attempt to convert known, conventional, large-scale, hydrogen production processes to micro-scale applications. In particular, PNNL has explored catalytic partial oxidation micro-reactors, whereas the other groups have developed steam-reforming micro-reactors.

A PNNL fuel reformer is depicted in FIG. 1. It has the advantage of a sandwich-like design that is complimentary with micro-electro-mechanical systems (MEMS) planar (i.e. two-dimensional) fabrication due to easy connection of sub-systems through common through-holes and structure lamination. However, such a system functions in a sequential series of stages for mixing, vaporization, combustion, and fuel reforming. This staging results in an increased operating temperature, a higher pressure drop, a larger reactor size, and requires the use of a complex network of fluidic channels and heat exchangers. To date, previous efforts have also failed to overcome certain limitations including operating at reduced reactor "skin" temperatures, which is required for safe portable power generation.

Accordingly, there is a need for an integrated micro fuel processor for hydrogen production and portable power generation that addresses certain problems of existing technologies.

SUMMARY

Briefly described, embodiments of this disclosure, among others, include apparatus for transporting a fluid, atomizers, reactors, integrated fuel processing apparatus, combinations thereof, methods of atomizing reactants, methods of moving fluids, methods of reverse-flow in a reactor, and combinations thereof.

One exemplary-apparatus for transporting a fluid, among others, includes: a channel for receiving a fluid; a sensor for determining an internal condition of the fluid in the channel; and a channel actuator in communication with the sensor for changing a cross-sectional area of the channel based on the internal condition, wherein the change in cross-sectional area controls a parameter selected from a pressure and a fluid flow.

An exemplary atomizer, among others, includes: a first reservoir for receiving a fluid; an atomizer actuator disposed in communication with the first reservoir for generating an acoustical pressure wave through the fluid; and a first set of ejectors including at least one ejector for dispensing atomized fluid in response to the acoustical pressure wave.

An exemplary reactor, among others, includes at least one internal channel for transporting a fluid in a first direction and a second direction.

An exemplary integrated fuel processing apparatus, among others includes: an atomizer and a reactor fluidically coupled to the atomizer. The atomizer includes a first reservoir for receiving a reactant, an atomizer actuator disposed in communication with the first reservoir for generating an acoustical pressure wave through the reactant, and a first set of ejectors including at least one ejector for dispensing atomized reactant in response to the acoustical pressure wave. The reactor includes at least one internal channel for transporting the reactant in a first direction and a second direction to produce a fuel.

An exemplary method of atomizing a reactant, among others, includes: providing an atomizer having at least one ejector nozzle, at least one atomizer reservoir, and at least one actuator, wherein the atomizer reservoir is disposed between the ejector nozzle and the actuator; activating the actuator to generate an acoustical pressure wave for forcing the reactant through the ejector nozzle; and atomizing the reactant to produce an atomized reactant.

An exemplary of moving a fluid, among others, includes: providing at least one channel that fluidically couples a first structure to a second structure, wherein the channel includes a flexible membrane responsive to a signal to expand and contract a cross-sectional area of the channel; and transferring the fluid to the second structure from the first structure by causing the flexible membrane to contract the cross-sectional area of the channel while the channel is under a constant parameter selected from a pressure and a flow rate.

An exemplary of reverse-flow in a reactor, among others, includes: providing a reactor having at least one internal channel for transporting a reactant in a first direction and a second direction to produce a fuel, wherein the reactor includes a catalyst disposed on the reactor; introducing the reactant to the reactor in a first direction at a first end of the reactor; and introducing the reactant to the reactor in a second direction at a second end of the reactor along the membrane, wherein introducing the reactant in the first direction and the second direction is alternated to achieve a forced unsteady-state operation of the reactor, and wherein the reactant reacts with the catalyst to produce the fuel.

Other apparatus, systems, methods, features, and advantages of this disclosure will be or become apparent to one with skill in the art upon examination of the following drawings and detailed description. It is intended that all such additional apparatus, systems, methods, features, and advantages be included within this description, be within the scope of this disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

In certain embodiments, the apparatus includes a fuel reservoir in communication with an actuator-driven, acoustically-responsive, micro-atomizer for providing low-power atomization of gaseous or liquid fuels. The micro-atomizer may include an array of silicon-etched ejector nozzles that are responsive to acoustic waves generated by the actuator elements to form atomized droplets of the fuel or the like. The micro-atomizer may also include two arrays of ejector nozzles disposed on opposing ends of the actuator device for providing parallel atomization capabilities.

In further embodiments, the fuel (liquid or gas) is channeled from the fuel tank to the atomizer array or directly to the reactor through a micro-channel or an array of parallel micro-channels, that may be piezo-electrically and/or capacitively actuated. The channels may include sensors for actuating the piezoelectric device in order to adjust the flow of the reagents there through.

In still further embodiments, the micro-channel delivers appropriate amounts of atomized fuel to a micro-machined, micro-reactor having one or more channels with an internally deposited catalyst and a hydrogen separating membrane integrated with the microchannels of the reactor for achieving high efficiency, in-situ hydrogen production. The micro-reactor is suitable for stand-alone operation as a hydrogen generator, or in conjunction with an energy-producing fuel cell to produce electrical power.

In addition to certain known benefits associated with micro-scale reactors in general, enormous opportunities arise to increase performance of catalytic processes using forced unsteady-state operation (FUSO) in the catalytic micro-reactor. The FUSO approach, particularly reverse-flow operation, makes it possible to generate and control the spatio-temporal patterns of temperature, concentrations and catalyst states that are not readily attained under steady-state operation of the micro-reactor. The transient operation provides thermodynamically favorable conditions for reversible reactions, such as declining temperature profiles for exothermal reactions and increasing temperature profiles for endothermic reactions, so as to achieve maximum reaction conversion and selectivity. FUSO also offers opportunities for exploiting catalyst dynamic properties, and generally results in lower average operating temperatures, thereby reducing undesirable pressure drops and heat losses.

Finally, in still further embodiments, lower-cost fabrication of the micro-reactor can be achieved by using fractal distribution of the catalyst over its internal channels, rather than a continuous deposition of catalyst, without unduly impacting reactor efficiency.

Turning now to FIGS. 2-33, wherein similar components of the present disclosure are referenced in like manner, various embodiments and components of an integrated micro fuel processor for hydrogen production and portable power generation are disclosed.

1. Integrated Fuel Processing Generator

Figure 1:
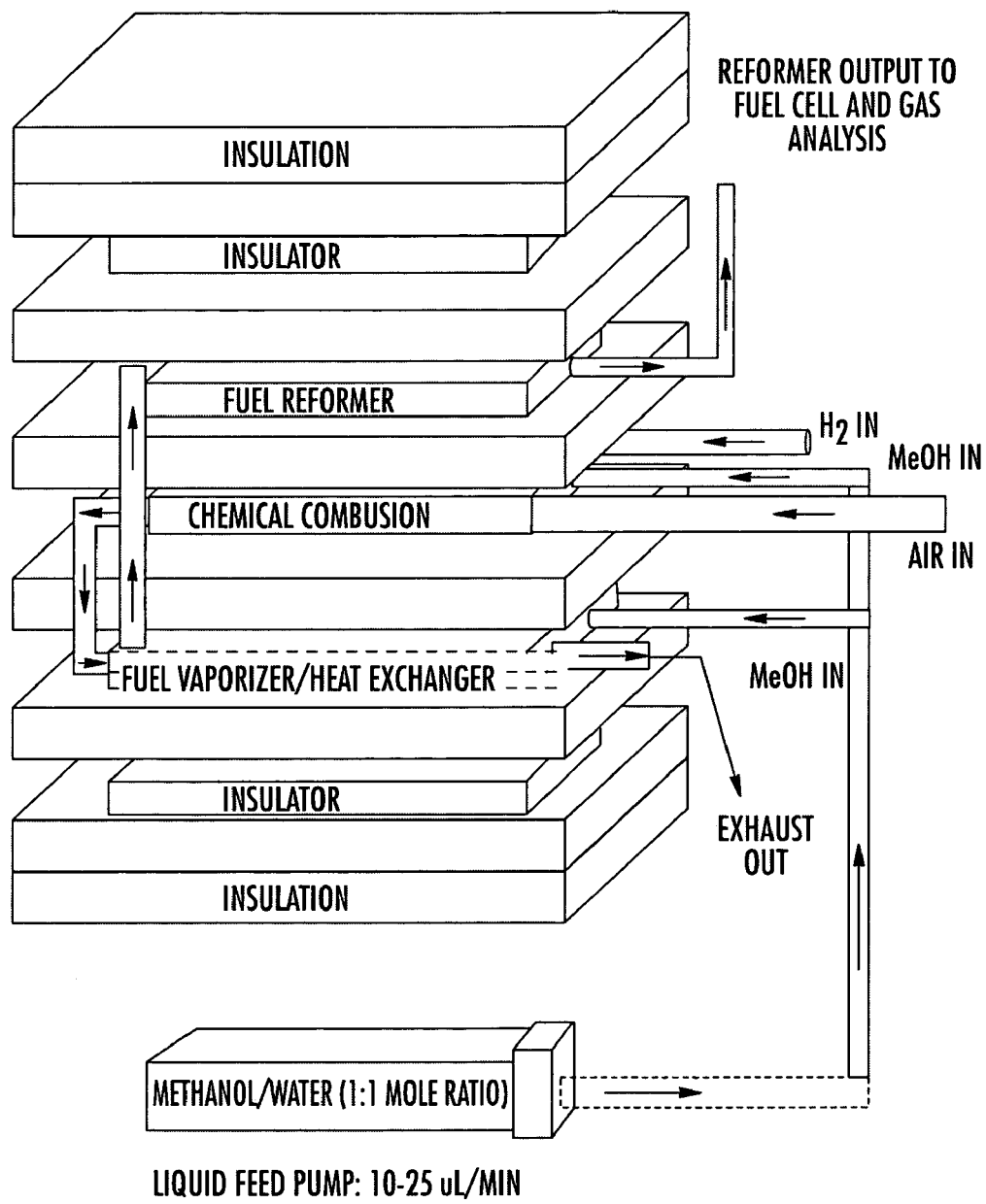
FIG. 1 is a schematic illustration of a stacked hydrogen fuel reformer of the prior art.
Figure 2:
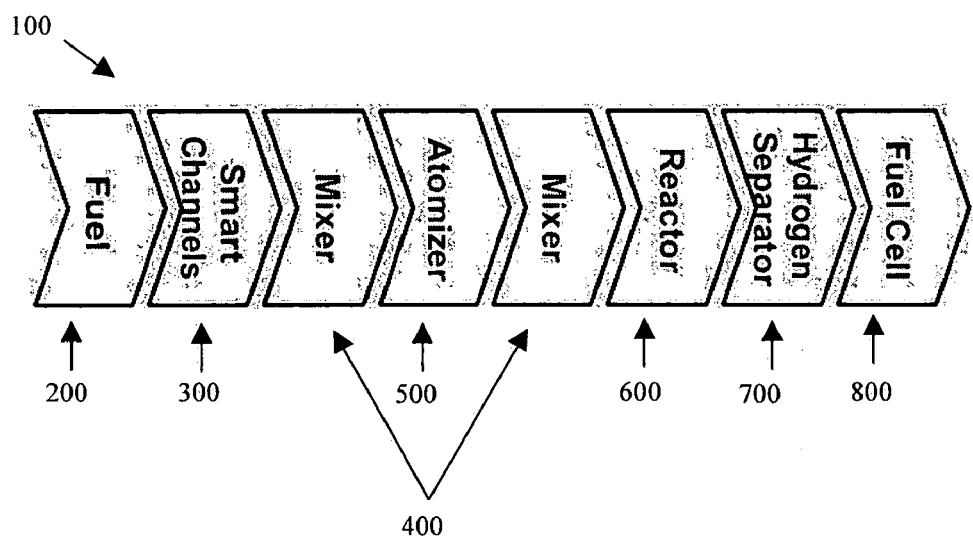
FIG. 2 is an illustration of an integrated system for accomplishing hydrogen production and fuel cell power generation, according to certain embodiments of the present disclosure.

FIG. 2 displays a schematic of an embodiment of an integrated system 100 for accomplishing hydrogen production and power generation via a micro fuel cell. The system 100 includes: a fuel reservoir 200 for storing a fuel; an array of channels (e.g.,smart microchannels 300) for distribution of fuel between reservoir and atomizer; an actuation-driven, micro-machined, acoustic atomizer 500 for low-power and on-demand atomization of fuels received from the fuel reservoir 200 via the channels; mixing chambers 400 for mixing the atomized fuel received from the atomizer 500; and a micro-machined catalytic micro-reactor 600, which is operated either in a unidirectional or a reverse-flow mode. The micro-reactor 600 includes one or more internal channels having a catalyst deposited therein for producing reaction products and may or may not have a hydrogen separating membrane 700 for high efficiency, in-situ hydrogen production therefrom. Components 200-700 are suitable for stand-alone operation as a hydrogen generator, or may, in certain embodiments, be operated in conjunction with a fuel cell 800 (e.g., a hydrogen fuel cell). In addition, the individual components (individually or in various combinations) may be used for applications other than fuel processing.

The integrated system 100 disclosed herein has the following general features in comparison to existing large-scale and sequential micro-scale systems. The micro-atomizer 500 may include an array of actuation-driven (e.g., piezo-electrically driven) ultrasonic ejectors (described in detail below with respect to FIGS. 3-7) that may be integrated with mixing chambers 400 for highly efficient atomization, evaporation, and mixing of the liquid reagents/fuel prior to their introduction to the micro-reactor 600.

The array of smart micro-channels 300 may connect the fuel reservoir to mixing chambers and the fuel atomizer described in FIGS. 10-13. The micro-channels 300 may also include pressure or other flow rate sensors disposed in a feedback loop to an actuator (e.g., a piezoelectric or capacitive actuator) that allows for precise control of the channel opening area and therefore pressure or other internal conditions of the fuel reservoir 200, the mixer 400 and/or the micro-atomizer 500, in order to optimize the total fuel throughput to the micro-reactor 600.

The micro-reactor 600 exploits the small size of its several internal channels, which may each be disposed with catalyst on an internal surface thereof in order to facilitate reaction kinetics. The chemical processing rates in a heterogeneous micro-reactor 600 increase significantly due to a decrease in the resistance to the species transport that is caused by a drastic reduction in the thickness of the boundary layer of the channel flow. Ideally, with a decrease in the cross-sectional area of its internal channels, reaction kinetics of the micro-reactor 600 can be achieved at an intrinsic rate and a sufficiently large reactor throughput can be readily maintained by using many, parallel, internal channels.

The high pressure differential needed to pump reagents through the micro-reactor 600, a potential disadvantage in prior systems, is instead exploited to provide sufficient pressure differential for hydrogen separation across the hydrogen separating membrane 700. Since pressure drop is inversely proportional to the dimension of the channel to the fourth power, an appropriate pressure difference across the membrane 700 can be readily established by varying the size of the internal reactor channels, the thickness of the membrane 700, and the back-pressure in any hydrogen-collecting manifold on the opposite side of the membrane 700. This essentially eliminates the need for an additional pump for the separation stage, as may be found in prior sequential hydrogen production systems.

Since the temperature inside a chamber of the micro-reactor 600 (but not of the reactor skin) may be high, particularly in the case of auto-thermal catalytic conversion of the hydrocarbon fuels, the hydrogen separation membrane 700 will be maintained at a sufficiently high temperature (about 400-600° C.) to achieve high permeability of hydrogen for a given pressure differential. This eliminates the need for additional heating equipment, such as burners and/or heat exchangers used for membrane heating during the separation stage in conventional systems.

Lastly with respect to the micro-reactor 600, the proposed reactor configuration is well suited for scale-up by stacking identical planar reactor units on top of each other to achieve increased hydrogen output for greater power applications.

The integrated system 100 may facilitate direct hydrogen removal from the micro-reactor 600, without waiting for the reaction products to leave the micro-reactor to start separation. This shifts the equilibrium of reversible steam reforming and water-gas shift reactions towards much increased rate of hydrogen production. Once removed from the reaction stream, hydrogen can either be collected in a storage manifold or, more optimally, be directly delivered to an anode of the fuel cell 800 that maybe integrated with the micro-reactor 600.

Each of the several components 200-800 will be described in turn and particular functions of the integrated system 100 will now be described. The choice and design of the components 200-800 described herein will first depend on the types of fluid or fuel being supplied to operate the integrated system 100. Ideally, gaseous hydrogen could be supplied directly to the fuel cell 800. This would forgo the need for including the micro-reactor 600 and the hydrogen separator 700 described herein. Such an embodiment of the system 100 could then utilize the following global electrochemical reaction at the fuel cell 800 to generate electricity:

$$2H_2+O_2 \rightarrow 2H_2O+\text{electricity}$$

This embodiment of the system 100 would be advantageous in that there would be no need for hydrogen producing devices such as components 600 and 700, and would readily generate a high power density. However, cheap sources of hydrogen fuel or hydrogen storage means are not readily available. Design of a system to withstand such conditions would be highly difficult and complex.

One alternate fuel choice, on which various of the following embodiments of the disclosure are based, is methanol or methane or any other hydrocarbon-based fuel. This alternate embodiment of the integrated system 100 may include the micro-reactor 600 and the hydrogen separator 700 for accomplishing hydrogen production. Such an alternate embodiment may utilize the chemical reactions described later below with respect to FIGS. 14-16 to produce hydrogen, in particular. Although for sake of brevity, the embodiments herein are described particularly with respect to methanol fuel and hydrogen production, it is readily contemplated that the integrated system 100 may be adapted to use wide variety of other chemical reactions, liquids, and fuels to produce a variety of reaction products.

In accordance with the previous descriptions, the integrated system 100 may first include a fuel reservoir 200 for storing liquids or fuels, such as a methanol fuel. The fuel reservoir 200, in certain embodiments, may be an external fuel supply, and may be a permanently-affixed, refillable and/or disposable container of such fuel.

In additional embodiments, the fuel reservoir 200 may be internal to the micro-atomizer 500. In such embodiments, the fuel reservoir 200 and/or the micro-atomizer 500 may include an inlet for receiving the fuel from an external source and temporarily storing the fuel prior to its being atomized and dispensed from the micro-atomizer 500.

2. Smart Channels

Referring now to FIGS. 10-13, and continuing reference to FIG. 2, the smart micro-channels 300 will now be described. Micro-channels 300, and arrays of such micro-channels 300, may be used to control the transport of fluid (gas or liquid) to be atomized through fluid channels 306 within the integrated system 100, or may be used for other applications. A fluid channel 306 may be micro-machined on any substrate material, preferably silicon, that is covered on at least one side (e.g., a top surface) or opposing sides by flexible membranes (e.g., comprising deposited dielectrics, such as silicon nitride or elastomers)

The micro-channels (300) may include a piezo-electric actuator 310 that displaces the flexible membrane, thereby causing the cross-sectional area (opening) of each fluid channel 306 to be increased or decreased, (FIG. 10, 320, 330 and FIG. 11) at one or several locations along each micro-channel 300. In another embodiment, the actuator may be of a capacitive action which employs a top electrode 303 and a bottom electrode 305 to form a capacitance, as shown in FIG. 11.

When the cross-sectional area of the fluid channel 306 decreases (increases), the hydraulic resistance to flow increases (decreases) drastically and, thus, either the flow rate of the fluid decreases (increases) drastically if the pressure difference is maintained constant between the two fluid reservoirs or the pressure difference between the fluid reservoirs increases (decreases) drastically if the flow rate through the channel is maintained constant. Application of DC and AC signals to the desired actuator electrodes at different locations of the channel can be used to expand/contract the channel with a desired spatial and/or temporal pattern, such as providing a peristaltic pump action. As a result, for example, the sequential expansion and contraction of the channel along its length may also generate the pumping action to transport fluid from one reservoir (e.g., fuel tank) to another reservoir (e.g., atomizer or mixing chamber of the microreactor).

Figure 10:
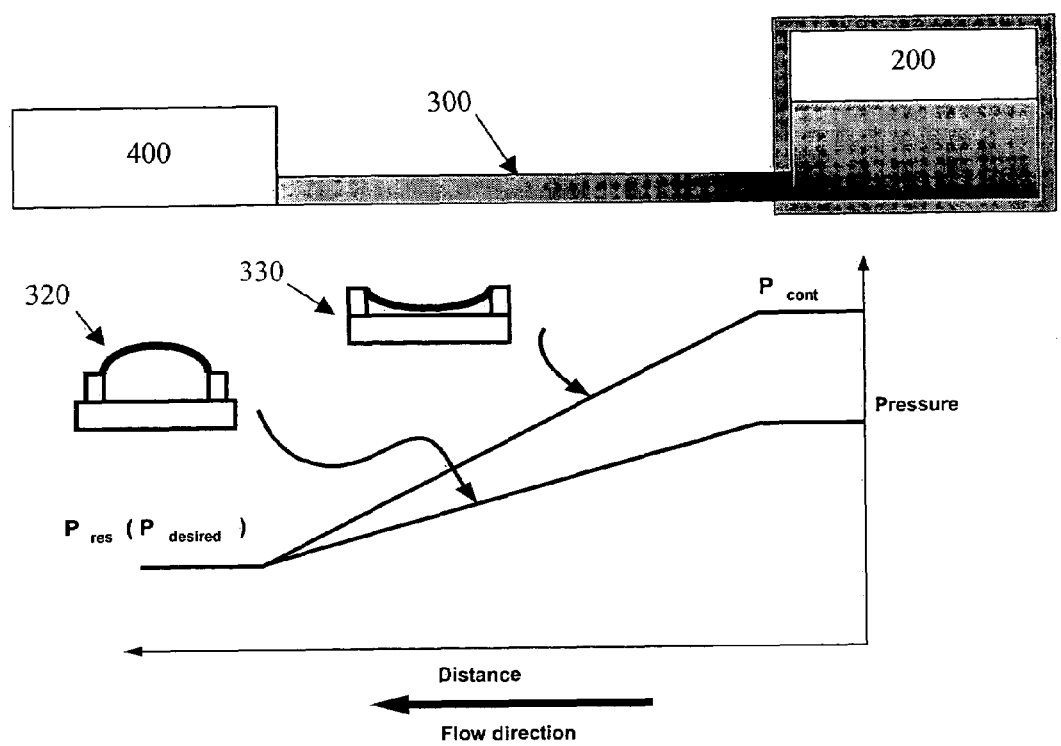
FIG. 10 is an illustration of a pressure response generated by certain change in the opening size of the microchannel.
Figure 11:
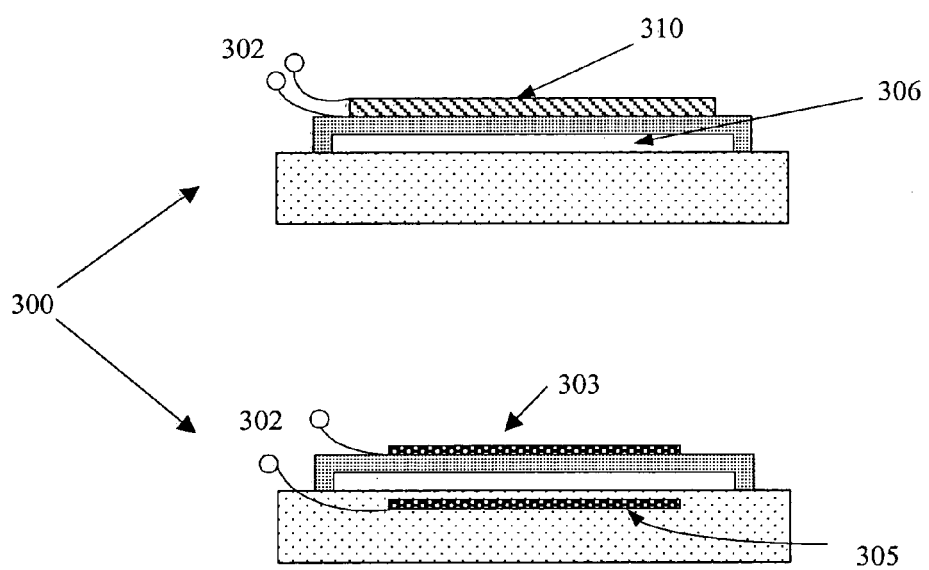
FIG. 11 is a side view of a micro-channel having piezoelectric or capacitive actuation.

In a particular example, a micro-channel array may be used to maintain pressure at the desired level (e.g., constant) in one of the fuel reservoirs 200, or in the chambers that lead to the mixer 400 or to the microatomizer 500 or to any other liquid delivery/storage system 200, FIG. 10 that are connected by the micro-channel 300.

Similar structures can be used in other applications where precise control and pumping of fluid or gas flow is needed, especially at low fluid or gas flow rates. The smart micro-channel array (see FIG. 13) consists of the following two main components: (1) the array of channels micromachined on any substrate material (preferably silicon) that are covered on one side (top, as shown in FIG. 11) or both sides by flexible membranes (e.g., deposited dielectrics such as silicon nitride or elastomers); and (2) each channel is supplied with one or several actuators of the piezoelectric or capacitive type.

Figure 13:
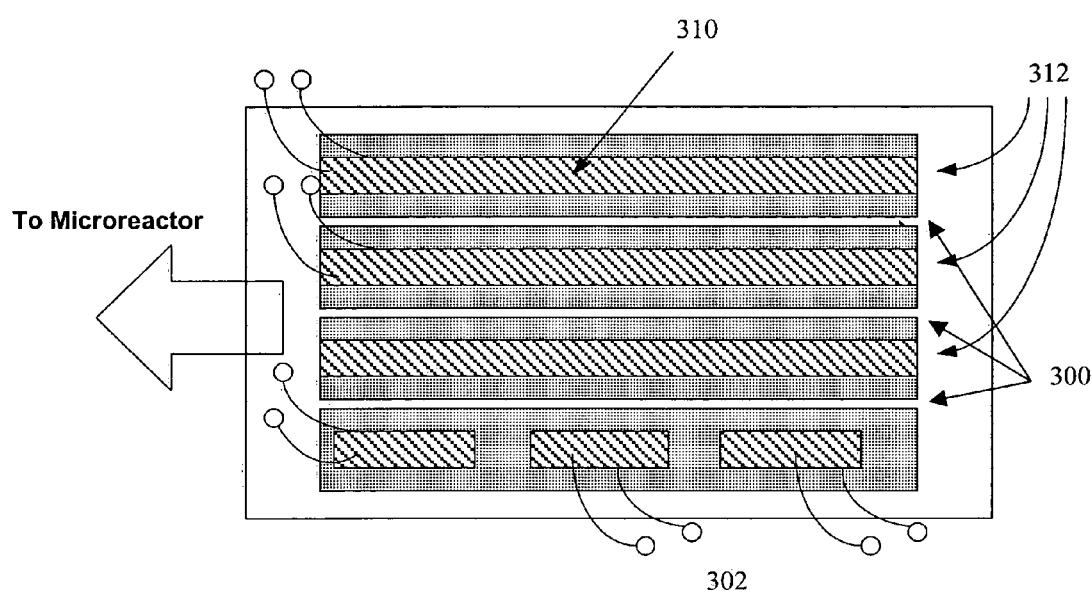
FIG. 13 is a top view of a micro-channel array according to various embodiments of the present disclosure.
Figure 14:
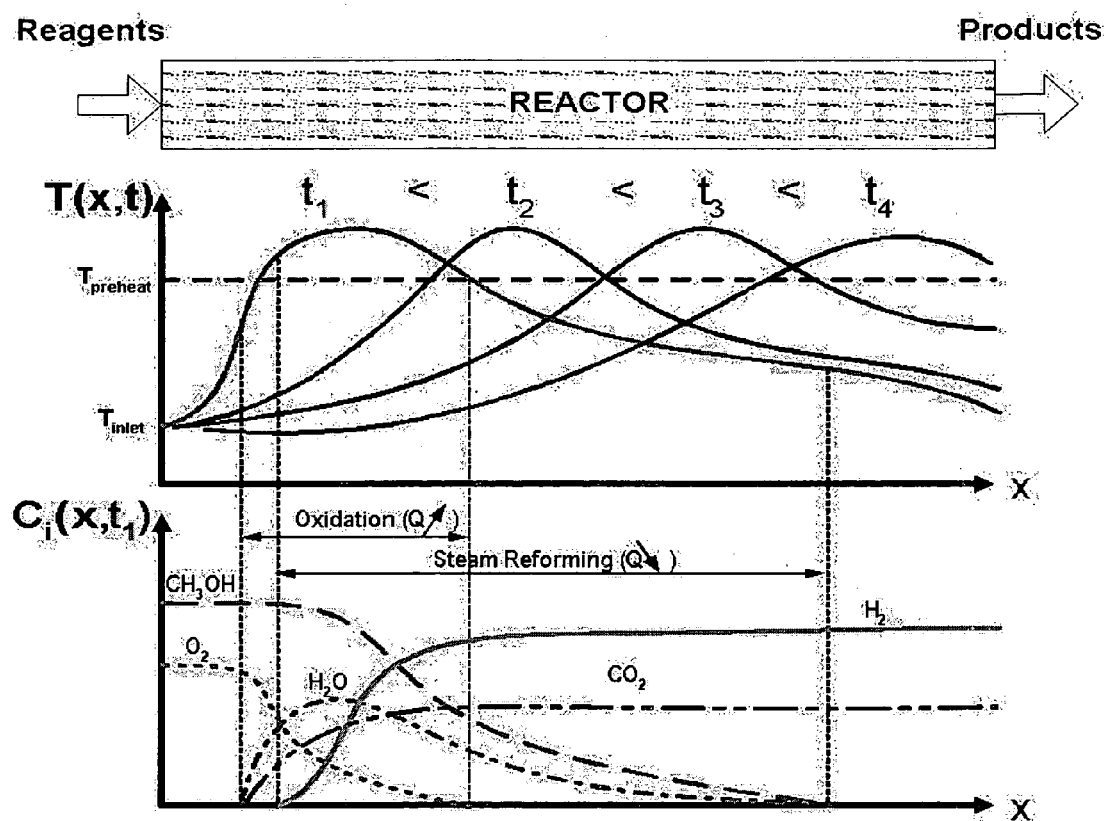
FIG. 14 is a graphical representation of hydrogen production in a micro-reactor under forward-flow conditions for catalytic. oxidation and steam reforming processes.

Each actuator can individually be activated and controlled by supplying proper combination of DC bias and AC voltage signals to the piezoelectric material or electrodes of the capacitive actuator 302, as shown in FIG. 13.

Figure 12:
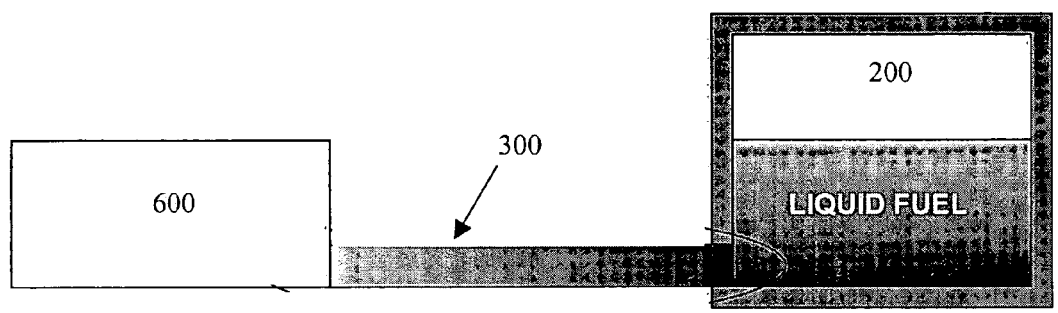
FIG. 12 is an illustration of a micro-channel array disposed between two fuel reservoirs.

Since a small change in the size results in tremendous change in the flow rate that is proportional to the forth power of a change in the channel hydraulic diameter for the constant pressure drop between two connected fluid reservoirs 200 and 400, as shown in FIG. 12, and likewise, since the volumetric flow rate increases proportionally to the forth power of an increase in the hydraulic diameter of the micro-channel 306 for the constant pressure drop between the two fluid reservoirs 200 and 400, a high signal amplification factor (or sensitivity) can be achieved using the above configurations for the micro-channel 300. Likewise, a high dynamic range of operation is made possible because the total flow rate or pressure difference between the two fluid reservoirs 200 and 400 may be controlled through very precise control of the resistance to the flow in each individual micro-channel 300. On-demand switching and easy integration with electronics is also readily accommodated. For example, the ability to controllably change on-demand the cross-sectional area of the channels provides the foundation for optimal design of the flow cells in chemical sensors as described in Phillips, C., Jakusch, M., Steiner, H., Mizaikoff, B., and Fedorov, A., 2003, "Model-Based Optimal Design of Polymer Coated Chemical Sensors", *Analytical Chemistry*, Vol. 75, No. 5, pp. 1106-1115, which is incorporated herein by reference.

FIG. 13 displays a top view of a particular embodiment including several micro-channels 300 forming a micro-channel array 340. Each micro-channel 300 therein may include an inlet 312 for receiving a liquid or a fuel from an external component. Each micro-channel 300 of the array 340 may further be actuated by an individually addressable piezoelectric or capacitive actuators 310, 303, and 305.

3. Microatomizer

Turning now to FIGS. 3-7, therein are depicted various embodiments of the micro-atomizer 500 that may be used alone for a variety of functions, or may be part of integrated system 100. Efficient atomization and mixing of liquid fuels is of paramount importance for compact and energy efficient fuel evaporation prior to hydrogen generation. However, fluid atomization has many other applications, including: drug delivery, encapsulation and scaffolding for pharmaceuticals; mixing and drug delivery via inhalation; chip-integrated cooling of electronic components; ink jet printing; providing patterned deposition of photoresist and coatings; ionization of compounds (molecules) for mass spectroscopy; low temperature & pressure, controllable generation of monodisperse droplets; and reagent delivery for high throughput drug screening essays. Subsequently, depending on the application, the fluid that is ejected can include, but is not limited to, a polymer, a suspension with solid particles or proteins, a gas, liquid (e.g., pure liquid or a liquid mixture with particles), and combinations thereof. The micro-atomizer 500 described herein is suited for all of these tasks, as well as performing similar functions in other chemical/reactor engineering, pharmaceutical, biomedical, thermal management, semiconductor manufacturing material science, biology and analytical chemistry applications.

Figure 3:
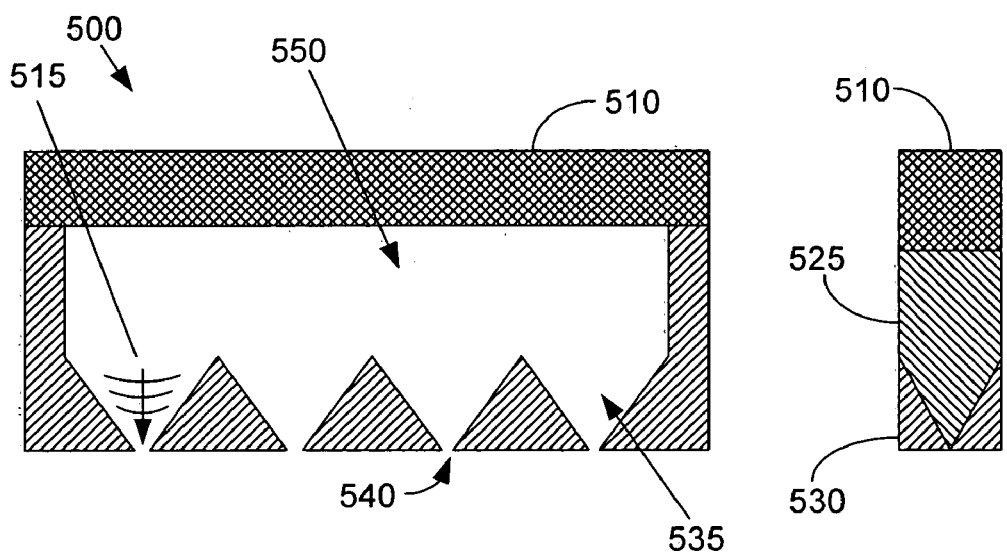
FIG. 3 is an illustration of one embodiment of the micro-atomizer of FIG. 2 in cross-section.
Figure 4:
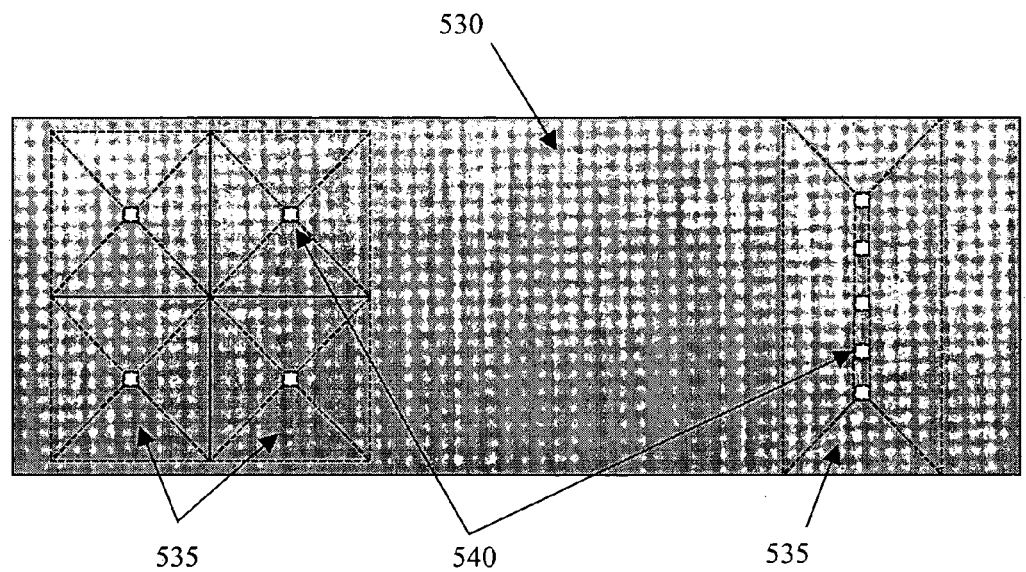
FIG. 4 is an illustration of various forms of ejectors of the micro-atomizer of FIG. 2.
Figure 5:
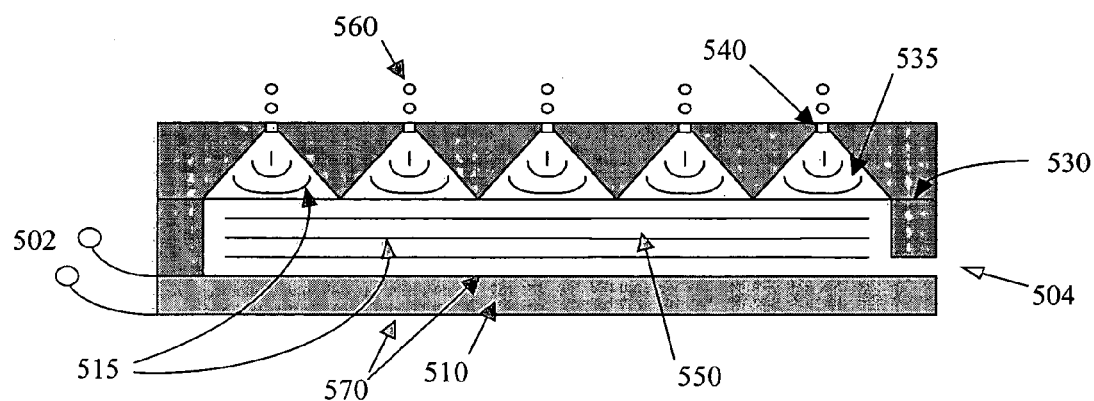
FIG. 5 is an illustration of a particular embodiment of the micro-atomizer of FIG. 2 that includes an inlet for an external supply of reagents.
Figure 6:
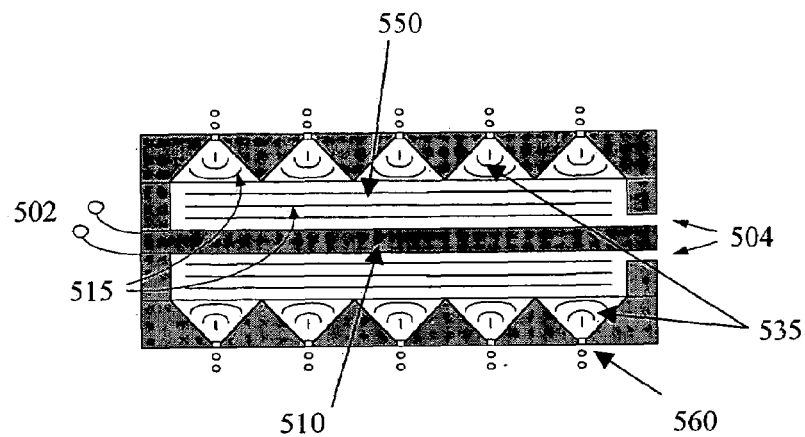
FIG. 6 is an illustration of a stacked micro-atomizer for parallel operation, according to certain embodiments of the present disclosure.
Figure 7:
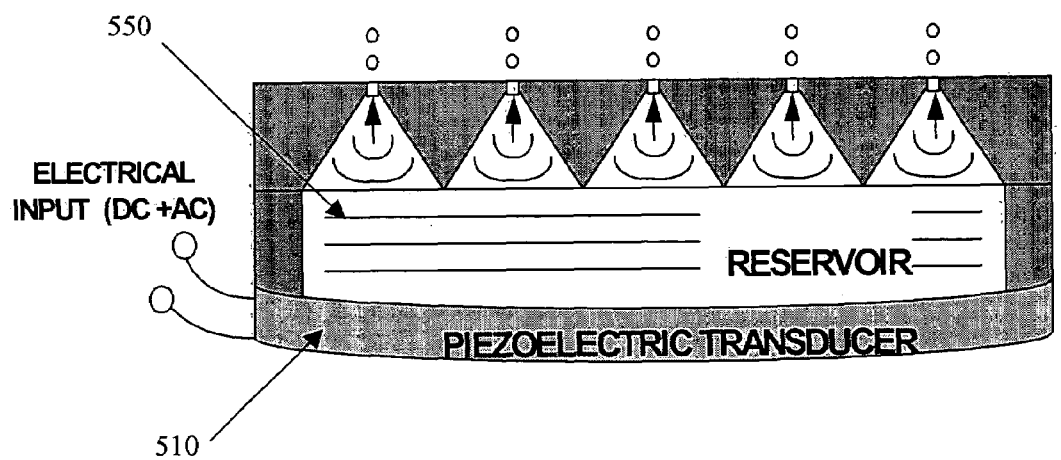
FIG. 7 is a diagram illustrating the volume change in a reservoir of the atomizer in response to DC voltage signal applied to piezoelectric transducer.
Figure 8:
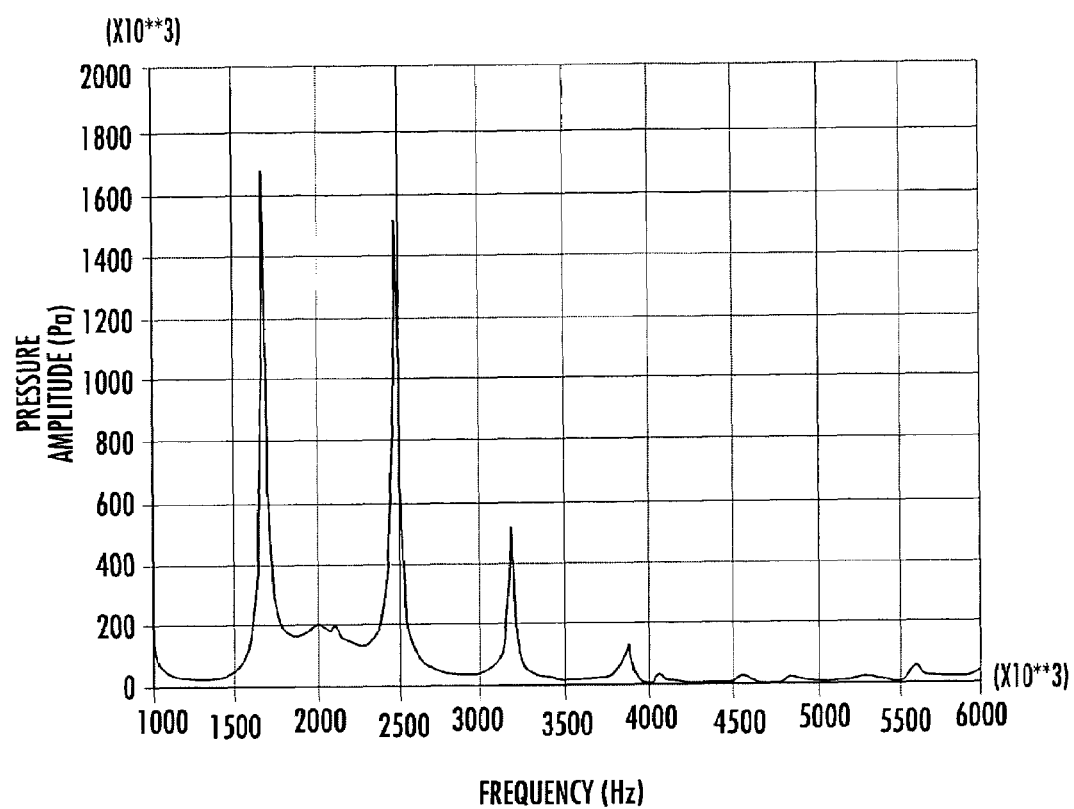
FIG. 8 is a graph of the simulated peak pressure near the ejection nozzle in the microatomizer cavity as a function of operating frequency of a piezoelectric device.

FIG. 3 displays a cross-section of one embodiment of the micro-atomizer 500, which has one or more ejectors 535 that uses resonant, focused acoustic waves 515 in liquid or gas acoustic horns to generate on demand high pressure gradients near micromachined nozzles 540 resulting in capability for controllable generation of monodisperse droplets at low temperature and pressure. The nozzle 540 forms an opening through which atomized fuel may be dispensed. The acoustic waves 515 may be generated by an integrated piezoelectric device 510, described in detail further below. In certain embodiments, the piezoelectric device 510 can be replaced by a micromachined capacitive ultrasonic transducer as described in several references (X. C. Jin, I. Ladabaum, F. L. Degertekin, S. Calmes and B. T. Khuri-Yakub, "Fabrication and Characterization of Surface Micromachined Capacitive Ultrasonic Immersion Transducers", IEEE/ASME Journal of Microelectromechanical Systems, 8, pp. 100-114, 1999, which is incorporated herein by reference).

In certain embodiments, the ejectors 535 and the integrated piezoelectric device 510 should have to include an internal reservoir 550 for temporarily storing the fuel or liquid 525 and creating the media/conditions for waves to propagate prior to atomized dispersal of the same. For example, the dimensions of the internal reservoir and the focusing acoustic horn can be selected to excite a cavity resonance in the atomizer at a desired frequency. The structures may have cavity resonances in about the 100 kHz to 100 MHz range, depending on fluid type, dimensions and cavity shape when excited by the piezoelectric device 510.

The structure for the ejectors 535 may be etched from silicon 530 or other materials that has substantially higher acoustic impedance as compared to the fluid filling the atomizer and the reservoir to make sure that the structure can confine and focus acoustic waves, as described later below. The structure of the ejectors 535 may, in various embodiments, be conical, pyramidal or horn-shaped with different cross sections, and may have a tri-angular cross-section as shown in FIG. 3. The structure of the ejectors 535 may have any cross-sectional area that is decreasing (linear, exponential or some other functional form) from a base of the structure to the nozzle 540. Such structures may have acoustic wave focusing properties in order to establish a highly-localized, pressure maximum substantially close to the nozzle 540. This results in a large pressure gradient at the nozzle since there is effectively an acoustic pressure release surface at the nozzle. Since the acoustic velocity is related to the pressure gradient through Euler's relation, a significant momentum is transferred to the fluid volume close to the nozzle during each cycle of the acoustic wave in the ejector cavity. When the energy coupled by the acoustic wave in the fluid volume is substantially larger than the restoring energy due to surface tension and other sources, the fluid surface is raised from its equilibrium position. Furthermore, the frequency of the waves should be such that there is enough time for the droplet to break away from the surface due to instabilities.

The nozzle size effectively determines the droplet size and the amount of pressure focusing along with the cavity geometry. The nozzle can be formed using various micromachining techniques as described below and can be circular, rectangular and other shapes. One further consideration with the size of the nozzle is that it is desirable, although not necessary to have the nozzle radius to be in the order of the wavelength of the capillary waves at the operation frequency. This insures that the energy of the acoustic waves results in droplet ejection as opposed to simply transferring energy to the capillary waves to oscillate the fluid surface.

The ejectors 535 may include one ejector 535, a (one-dimensional) array of ejectors 535 or a (two dimensional) matrix of parallel arrays of ejectors 535. As shown in FIG. 4, the ejectors 535 may include one nozzle 540 each or include a plurality of nozzles 540 in a single ejector 535. In certain embodiments of ejectors 535 integrated with the piezoelectric device 510, the micro-atomizer 500 may include a second ejector or array or matrix of ejectors 535 disposed on opposing sides of the piezoelectric device 510 to provide parallel atomization of the liquid or fuel 525, as shown in FIG. 6.

The design of the atomizer is what allows for the low operating temperature and pressure, as well as the controllable generation of monodisperse droplets of the fuel or liquid 525. Integration of the ejectors 535 with the piezoelectric device 510 readily accommodates on-demand switching, manipulation and control of both flow rates and pressure in order to achieve highly uniform atomization at low flow rates in the micro-atomizer 500, or in other components in communication with the micro-atomizer 500. The integrated micro-atomizer 500 also provides control of the velocity and uniform diameter of ejected droplets, which may range from tenths of micrometers to several micrometers (μm), depending on the size of the nozzles 540. The integrated micro-atomizer 500 also allows for low temperature operation and low power consumption due to resonant operation. A sensor (not shown) may be readily included with the micro-atomizer 500 for detecting a condition, such as internal pressure, within the internal fuel reservoir 550 and automatically actuate the piezoelectric device 510 to correct the detected internal condition during operation of the micro-atomizer 500.

EXAMPLE 1

The following illustrates a method for manufacturing an assembly of the microatomizer. This is not the only method for fabrication:

Low-cost manufacturing and assembly of the micro-atomizer may be realized using the following MEMS batch fabrication process. First, a silicon wafer is coated on opposing sides with a silicon nitride masking layer (for example, $Si_3N_4$). Next, photolithography and inductively coupled plasma (ICP)-etch techniques may be used to define the areas on one side of the silicon wafer for the ejector(s) of the micro-atomizer 500. A potassium hydroxide (KOH) anisotropic etch of silicon is then performed to define the pyramidal shaped horn structure of the ejectors 535 and the nozzles 540. The nitride layer is then removed using reactive ion etching (RIE) process. If necessary, the nozzles 540 may next be opened from the back-side of the silicon wafer using a KOH etch or an ICP etch. The ejectors 535 may then be cut from the wafer, using a dicing saw or other similar device, after which the array of ejectors 535 may be prepared for fabrication of the internal fluid reservoir 550.

MEMS fabrication of the internal reservoir 550 of the micro-atomizer 500 may proceed in a similar manner. First, a silicon wafer is coated with silicon nitride. Lithographic techniques are then used to define the area of the internal reservoir 550 and an inlet 504 from an external supply, if desired. Any necessary through-holes for the internal reservoir 550 may then be KOH- or ICP-etched. The structure for the fluid reservoir is then diced or cut from the wafer.

The structure of internal reservoir 550 is then prepared and bonded or adhered to the ejector 535, with the nozzles 540 pointed away from the internal reservoir 550. The piezoelectric device 510 (such as a transducer, a piezoelectric single crystal or a piezoelectric ceramic) is cut and cleaned. Electrodes, such as platinum or silver electrodes are then deposited on the piezoelectric device 510. Electrical leads 502 may then be bonded to the electrodes in order to provide alternating current and/or direct current signals to actuate the piezoelectric device 510. Finally, the piezoelectric device 510 is adhered or bonded to the structure of the internal reservoir 550 on an opposite side from the ejectors 535 to form the micro-atomizer 500, shown in cross-section in FIG. 5.

A micro-atomizer 500 formed in any of the foregoing manners may use megahertz (MHz) frequency acoustic waves to resonate the acoustically-responsive ejectors 535 and potentially to amplify the acoustic energy at the free surface of liquid at the nozzle tip, and thus facilitate atomization with low power consumption. It should be clear that higher (lower) frequency may be used as long as attenuation in the fluid or losses are not excessive. In one embodiment, a single piezoelectric device 510 may be used to drive an entire array or matrix of injectors 535, which is kept cool by continual immersion in the liquid fuel. The size of ejected droplets 560, droplet ejection speed and the flow rate may be controlled by the size of the nozzle 540, the amplitude and frequency of acoustic waves 515, respectively, generated by the piezoelectric device 510.

3.1 Atomizer with Pressure Control of Liquid in the Fuel Reservoir.

For controllable and stable fuel atomization, the pressure of the fuel in the reservoir 550 needs to be maintained at a certain level. The piezoelectric transducer 510 can be used for that purpose in addition to providing the AC driving for atomization. This is achieved by applying a DC bias voltage in addition to the AC atomization signal as shown in FIG. 7. The volume change induced by the piezoelectric transducer can be enhanced by forming a bimorph structure or a membrane structure, if needed. For example, initially, the piezoelectric can be biased to increase the reservoir volume, applying suction to the liquid fuel stored in an external fuel container. During operation, the bias can be changed to move the transducer up reducing the volume of the reservoir. A one way valve (not shown) can be used to prevent the return of the fuel sucked in during the initial fuel reservoir loading to the external fuel container. In this case the valve operation is similar to an electrical diode where the flow is analogous to electrical current. The pressure can be controlled in a closed loop using a pressure sensor in the fuel reservoir generating the drive signal for the piezoelectric transducer.

In order to increase the throughput of chemical processing in the system 100, the ejector arrays 535 can be stacked vertically so that a single piezoelectric device 510 can drive the atomization from more than one internal fuel reservoir 550 to generate atomized fuel droplets 560, as shown in FIG. 6.

Although particular embodiments of the ejectors 535 have been described above, it is contemplated that a variety of other embodiments may be employed. Instead of being formed from silicon, the ejectors 535 may instead be etched, stamped or otherwise formed from a variety of materials, including aluminum, other metals, and plastics.

EXAMPLE 2

Modeling and Performance of a Silicon Microatomizer

Experimental results from a modeling of the silicon micro-atomizer 500 are shown in FIGS. 8-9. Modeling of the acoustic response of the micro-atomizer 500 was performed using ANSYS finite element calculation software to identify the resonant frequencies of the micro-atomizer structure (including the ejector 535, the internal reservoir 550 and the piezoelectric device 510) that would result in the greatest amplification of the pressure gradient at the nozzle 540. The simulated micro-atomizer 500 consisted of a number of identical ejectors etched in silicon. A one millimeter (mm) thick piezoelectric device 510 was supplied with a sinusoidal voltage signal, which generated an acoustic wave 515 into the liquid-filled ejector 535. In this example, the piezoelectric device is made of PZT-5H, a common piezoelectric ceramic. Multiple reflections of acoustic waves 515 from the walls of the ejector 535 and the internal reservoir 550 established a standing acoustic wave in the ejector 535 with the maximum pressure gradient at the nozzle tip 540, from which the atomized fuel droplet 550 is dispensed.

In simulations, a one-dimensional (1-D) triangular ejector 535 having internal wall angles of 54.74°, which would result from a conventional anisotropic KOH etch of a silicon wafer, was filled with water and acoustic waves were produced by a piezoelectric device 510 actuated with a 1.0 volt signal at different frequencies. The goal of the simulations was to identify the resonant frequencies of the ejector 535 that would result in the greatest amplification of the pressure at the nozzle 540. Simulation of the frequency response of the ejectors 535 were performed for piezoelectric device 510 driving frequencies ranging from 1 to 6 MHz to find out the frequency or frequencies at which resonance occurs in the ejector 535. The maximum pressure amplitude at a node near the tip or nozzle 540 of the ejector 535 is displayed in FIG. 8. It can be observed that the first resonance occurs around 1.7 MHz, and the second resonance occurs at around 2.47 MHz frequency, which are readily achievable with the available piezoelectric materials, for example PZT-SH or PZT-8 bulk piezoelectric ceramics.

Figure 9:
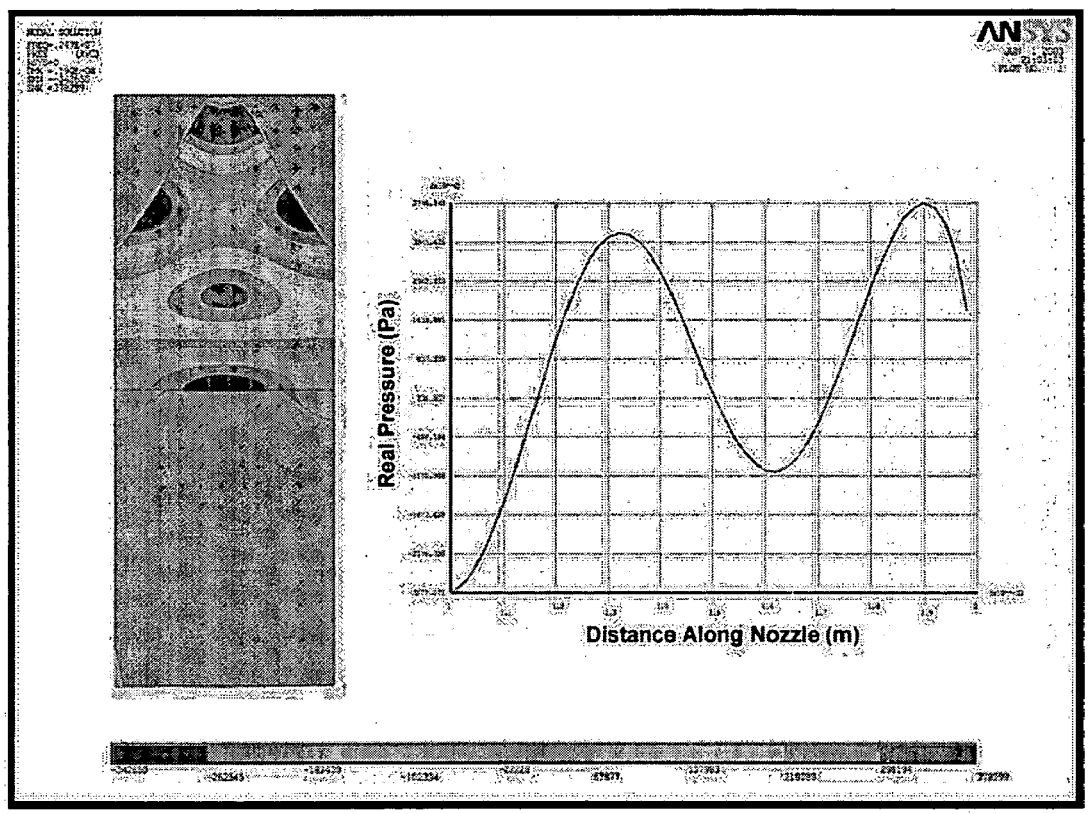
FIG. 9 is a graph of a real part of a simulated pressure response of an ejector of the micro-atomizer.

A contour plot of the real part of the pressure amplitude at the second resonance frequency (2.47 MHz) is shown in FIG. 9, where a nozzle width of 20 μm is assumed. It can be seen that acoustic waves 515 indeed focus close to the nozzle 540 where the pressure amplitude is increased significantly near the nozzle tip establishing sufficient pressure gradient for droplet ejection. When the nozzle 540 is open, a pressure release surface will be introduced resulting in a larger pressure gradient around the nozzle, thus forcing the formation of atomized droplets 550. Note that the simulations are done using a 1-D model for the ejector, so the focusing occurs only in one dimension. With a 2-D atomizer structure the focusing will be enhanced due to concentration of the energy by the reduced area.

To validate the simulations of the micro-atomizer 500, a device was constructed according to the parameters listed above for the examples 1 and 2 and a sinusoidal voltage signal-was applied to a bulk piezoelectric transducer 510 with the frequency gradually varied from one to three Megahertz. The first resonance was observed at both 1.481 MHz, and the second one was found at 2.263 MHz, both of which correspond well with theoretically predicted values. At these frequencies, the resonant pressure amplification occurs at the nozzle 540 and several thin jets of water droplets were emitted from the ejector 535. On-demand turn on-off switching was achieved by changing the amplitude of the voltage signal applied to the piezoelectric device 510.

3.3 Spatially and Temporally Controlled Droplet Ejection and Control of Ejection Parameters In additional embodiments, the ejectors 535 may have one or several individually-addressable nozzles 540. This may be accomplished in any of a variety of manners. In particular, the piezo-electric device 510, or the several electrodes 570 thereof, may be partitioned, segmented or otherwise individually arranged to excite one or several particular ejectors 535 upon actuation. Alternatively, or in addition thereto, an electrostatic, piezoelectric or magnetic on/off actuator (not shown) may be disposed at the nozzle 540 to, for example, open and close the nozzle 540 in an individually addressable manner while the piezoelectric device 510 is activated with a continuous wave signal. In this manner, the spatial and temporal distribution of the droplets can be controlled.

The microatomizer can also be used for drop-on-demand operation in time domain by modulation of the actuation signal. The piezoelectric device 510 can be excited by a finite duration signal with a number of sinusoidal cycles (a tone burst) at the desired frequency. Since a certain energy level needs to be reached for droplet ejection, during the initial cycles of this signal the standing acoustic wave pattern in the resonant cavity is established and the energy level is brought up to the ejection threshold. The number of cycles required to achieve the threshold depends on the amplitude of the signal input to piezoelectric device 510 and the quality factor of the cavity resonance. After the threshold is reached, one or more droplets can be ejected in a controlled manner by reducing the input signal amplitude after the desired number cycles. This signal can be used repetitively, to eject a large number of droplets. Another useful feature of this operation is to reduce the thermal effects of the ejection on the piezoelectric device 510, since the device can cool off during when the ejector is turned off between consecutive ejections. The ejection speed and droplet size can also be controlled by the amplitude of the input signal and duration. These parameters can be optimized for particular microatomizer application.

4.0 Micro Reactor

4.1 Principles and Benefits of Reverse-flow Autothermal Operation: Background Turning now to FIGS. 14-16, a micro-reactor 600 and various sub-components thereof will now be described. Micro-scale fabrication of the reverse-flow micro-reactor 600 provides several attractive design features in comparison to large-scale hydrogen production systems. In particular, it removes diffusion limitations (~1/Diameter) on the kinetics of chemical reactions, thereby allowing them to run at their intrinsic rate while maintaining sufficient reactor throughput by using parallel chemical processing in many identical channels. There is an increase in the reaction productivity that is achievable by exploiting a non-equilibrium, ultra-fast surface chemistry of the interior of the micro-reactor 600 that drastically decreases the time constant ($1/Diameter^2$) for internal flow of reactants. Finally, micro-scale fabrication techniques offer unmatched opportunities for precise control of surface properties and placement of catalyst at optimal locations in the internal channels of the micro-reactor 600.

In order to discuss a particular design of the hydrogen producing micro-reactor 600, it is first necessary to determine a preferred chemical reaction from which hydrogen production will take place. To that end, and given the inherent size limitations of the system 100, catalytic reactions have been determined to be the most readily accommodated by the micro-reactor 600.

The known chemical processes for producing hydrogen from a generic hydrocarbon fuel $C_nH_m$ are as follows:

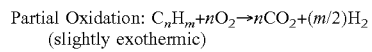
Partial Oxidation: $C_nH_m + nO_2 \rightarrow nCO_2 + (m/2)H_2$
(slightly exothermic)

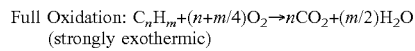
Full Oxidation: $C_nH_m + (n+m/4)O_2 \rightarrow nCO_2 + (m/2)H_2O$
(strongly exothermic)

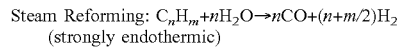
Steam Reforming: $C_nH_m + nH_2O \rightarrow nCO + (n+m/2)H_2$
(strongly endothermic)

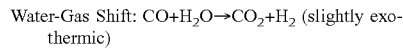
Water-Gas Shift: $CO + H_2O \rightarrow CO_2 + H_2$ (slightly exothermic)

Among these various alternatives, production of the hydrogen-rich synthesis gas ($H_2/CO$ mixture with some $CO_2$, $H_2O$, and $N_2$ reaction products) followed by the hydrogen separation from the stream via composite metal (palladium-copper alloy or palladium-silver) is one of the most economically plausible processes for hydrogen production. Conversion of various hydrocarbon fuels (e.g., methane or methanol) into a synthesis gas can be accomplished by a variety of different techniques. Two main forms of catalytic reactions for producing hydrogen gas using methane fuel as a reactant are identified herein, namely, partial oxidation and steam reforming.

A micro-reactor utilizing catalytic partial oxidation demonstrates a faster start-up time, respond more rapidly to change in fuel feed, and be more compact than with other processes. However, catalytic oxidation produces a lower hydrogen yield and must operate at higher internal temperatures than other available processes. On the other hand, catalytic steam reforming produces a higher hydrogen yield at lower micro-reactor temperatures as compared to catalytic oxidation processes. However, this reaction is highly endothermic and thus requires external heating. A system incorporating only steam reforming will require a longer start-up time and a larger size for the micro-reactor 600 as well as being less responsive to changes in feed composition.

Forced unsteady-state operation (FUSO) operation of the catalytic micro-reactor 600, particularly auto-thermal reverse-flow operation, appears most promising from the viewpoints of productivity, energy efficiency and selectivity for reconciling the short-comings of each process identified above. Further details are discussed by Matros, Y. S. "A Review: forced unsteady-state processes in heterogeneous catalytic reactors", *Canadian Journal of Chemical Engineering*, 74, p. 566 (1996). Reverse-flow operation has the following beneficial properties: it reduces heat transfer resistance by minimizing the distance and time that heat needs to travel within the micro-reactor (i.e., wherever heat is produced, it is consumed within a few milliseconds), thereby significantly lowering average operating temperatures and heat losses (in turn requiring less insulation of the reactor skin). FUSO substantially eliminates the possibility of hot spots and thermal runaway in the micro-reactor, and it results in reduced reactor size and pressure drop, which positively impact the cost and portability of the system. Reverse-flow operation in particular offers other thermodynamically favorable conditions (i.e., declining temperature profile for exothermic reactions and increasing temperature profile for endothermic ones), which are impossible to attain during steady-state, unidirectional operation. Reverse flow operation additionally exhibits low sensitivity to large composition and reagent flow rate fluctuations, resulting in easier operation and control of the micro-reactor.

The reverse-flow operation allows combined use of strongly exothermic partial oxidation with endothermic, heterogeneous, steam reforming, followed by the slightly exothermic water-gas shift reaction. As an example, in the case of methane, the following global reactions can be employed by a reverse-flow micro-reactor 600:

$$CH_4 + 2O_2 \rightarrow CO_2 + 2H_2O \quad \Delta H^0_{298} = -802.0 \text{ kJ/mol}$$
$$CH_4 + H_2O \leftrightarrow CO + 3H_2 \quad \Delta H^0_{298} = +206.1 \text{ kJ/mol}$$
$$CO + H_2O \leftrightarrow CO_2 + H_2 \quad \Delta H^0_{298} = -41.15 \text{ kJ/mol}$$

where $\Delta H^0_{298}$ denotes the amount of energy in kilojoules/mol that is released (demonstrated by a negative number) or absorbed (demonstrated by a positive number) by each process.

Figure 15:
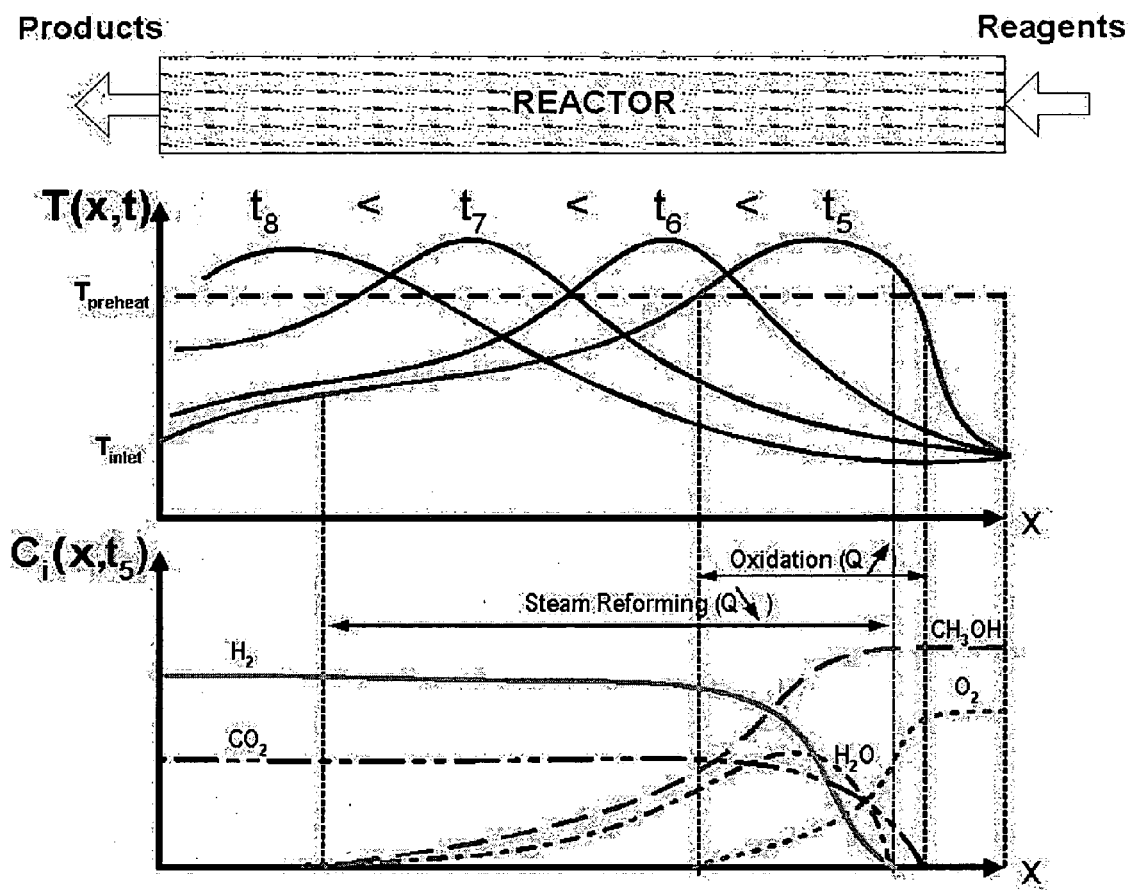
FIG. 15 is a graphical representation of hydrogen production in a micro-reactor under reverse-flow conditions for catalytic oxidation and steam reforming processes.

By proper combination of the feed composition, a hybrid partial oxidation and steam-reforming process can be made slightly exothermic, it may be readily employed in the autothermal reverse-flow catalytic micro-reactor. In order to initiate this hybrid process, the micro-reactor is first pre-heated to a uniform temperature required for "ignition" of the oxidation reaction. Thereafter, it continuously operates via auto-thermal heat regeneration accomplished by periodic flow reversal. As an up-stream portion of the micro-reactor is progressively cooled down by the cold reactants entering the micro-reactor, the methane partial oxidation process generates heat and a temperature wave propagates through the micro-reactor in the direction of the fuel flow. According to the present disclosure, the flow is reversed before the reaction zone reaches the exit of the micro-reactor. This causes the high temperature wave front to move in the opposite direction. Thereby, the heat is effectively retained inside the catalytic chamber of the micro-reactor. Furthermore, external reheating is not needed to maintain the reaction operation, as shown by the graphs of temperature and reagent/product concentration profiles for reverse-flow, auto-thermal operation with methanol fuel in a forward direction (FIG. 14) and the reverse direction (FIG. 15). Fine-tuning of the temperature profiles in the micro-reactor can be accomplished by adjusting the steam reforming catalyst deposited therein.

In addition to favorable auto-thermal operation, the oscillatory motion of the high temperature wave in the micro-reactor leads to gasification and removal of carbon and soot, which would otherwise be deposited on and poise the catalyst deposited on the channels of the micro-reactor 600 due to endothermic methane cracking and exothermic Boudouard reactions. Furthermore, partial oxidation features much lower carbon monoxide (CO) content in the product stream (as compared to steam reforming) which is an important consideration, since CO is a detrimental to the anode catalysts used in conventional proton exchange membrane (PEM) fuel cells, such as may be used as fuel cell 800.

Figure 16:
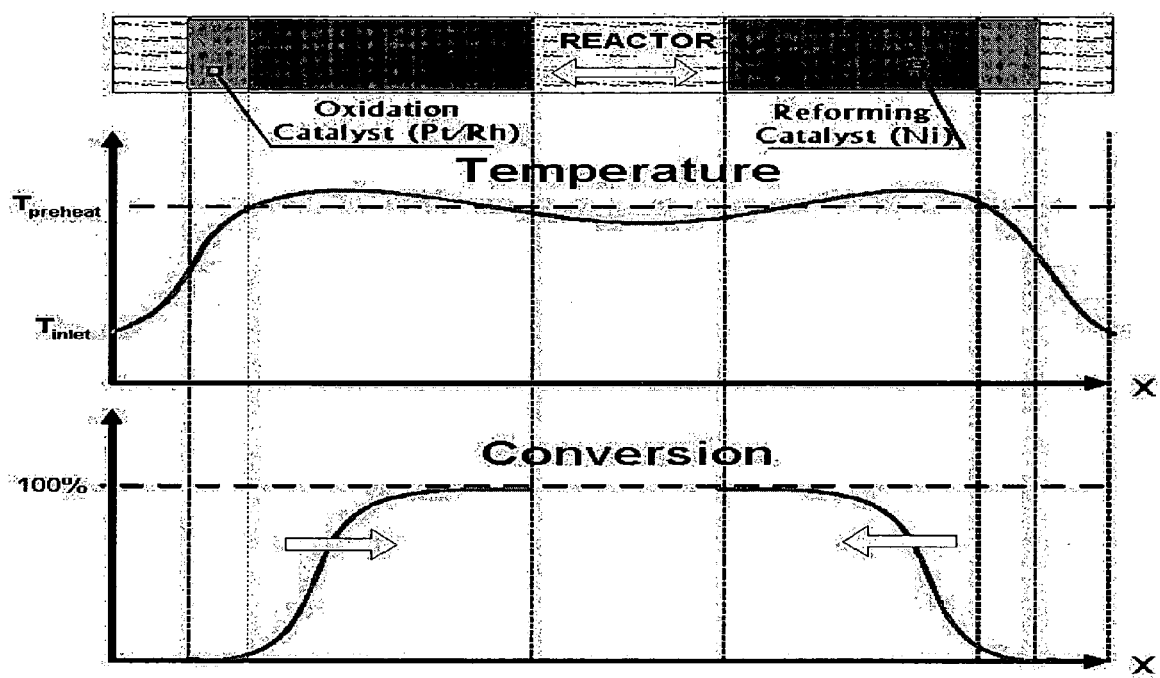
FIG. 16 is graph displaying quasi-steady-state operating conditions of a reverse-flow micro-reactor and optimal locations in its internal channels for deposition of oxidation and reforming catalysts.

After several flow reversals, a quasi-steady state temperature profile, shown in FIG. 16, is established in the micro-reactor with an extended zone of approximately uniform elevated temperature in the middle of the reactor (providing optimal conditions for the endothermic steam reforming reaction) and declining temperature profiles on both ends of the reactor (providing optimal conditions for the exothermic oxidation and water-gas shift reactions). This results in maximum reactor conversion and selectivity. The reverse-flow operation of the micro-reactor makes it possible to generate and control the spatio-temporal patterns of temperature, concentrations and catalyst states that cannot be attained under steady-state unidirectional operation. The heat is effectively retained inside the catalytic micro-reactor, thus allowing for lower operating skin temperatures. It also offers opportunities for exploiting catalyst dynamic properties, and results in much lower average operating temperatures, thereby reducing heat losses and pressure drop. Finally, as is also shown in FIG. 16, the temperature profiles dictate an optimal placement of reforming catalysts (such as, but not limited to, nickel), oxidation catalysts (such as, but not limited to, platinum (Pt) or rhodium (Rh)), and shift catalysts.

4.2 Microreactor Design

Figure 17:
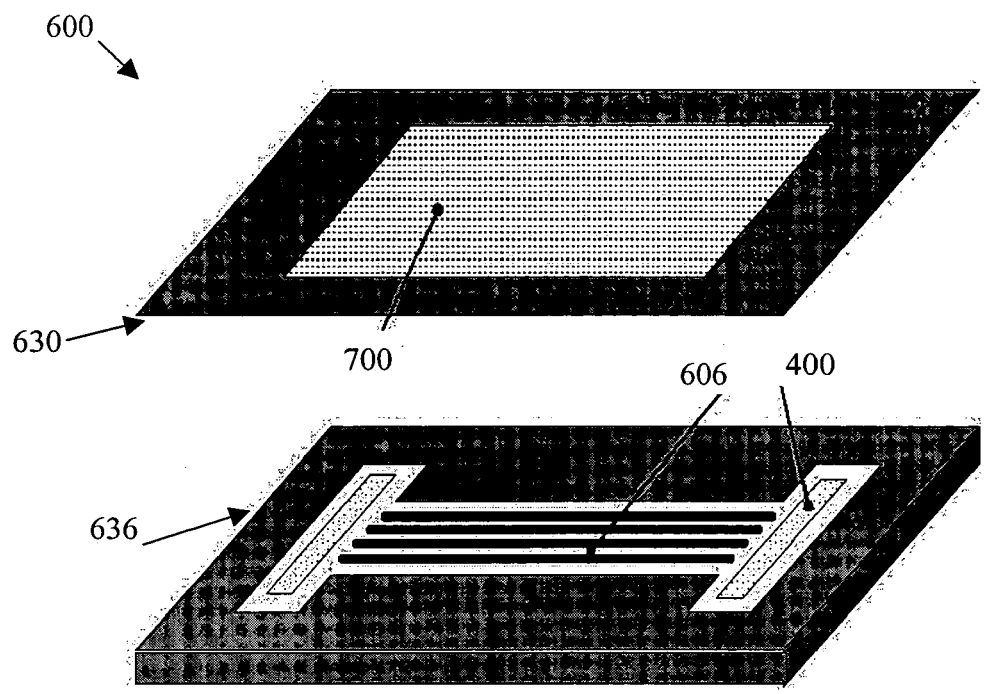
FIG. 17 is an illustration of a planar micro-reactor according to certain embodiments of the present disclosure.
Figure 24:
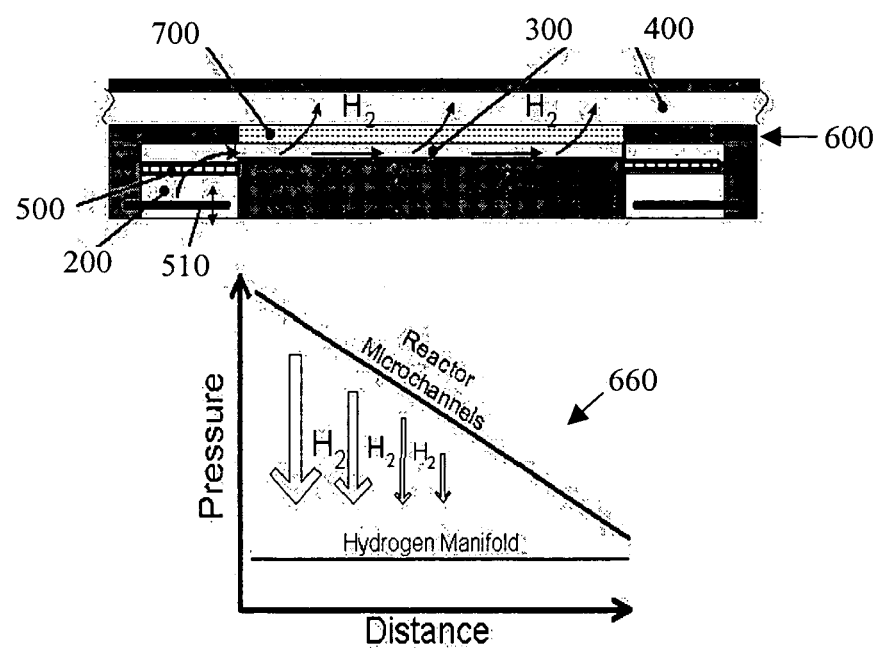
FIG. 24 is an illustration of an assembled integrated system for hydrogen production, separation, and utilization and the pressure distribution within the microreactor channels.

FIGS. 17 and 24 are schematic diagrams of one embodiment of a planar micro-reactor 600. The micro-reactor 600 includes mixing chambers 400 disposed in communication with one or more internal reactor channels 606. The reactor channel(s) 606 have a catalyst deposition thereon for reacting with the mixed reagents received from the mixing chambers 400. The internal channels 606 further dispense the reaction products to the hydrogen separating membrane 700 due to the significant pressure resulting from the flow in microchannel geometry (inversely proportional to the channel characteristic dimension in the forth power), as shown in the insert of FIG. 24. The high temperature generated in the reactor channels result in heating of the hydrogen separating membrane, further increasing permeability and separation efficiency of the membrane. Further, the in-situ removal of hydrogen from the product stream within the reactor shifts the equilibrium of the reversible catalytic reactions, resulting in an additional increase in the overall hydrogen production.

The hydrogen separating membrane 700 may be used to selectively transport or filter hydrogen (or other desired compound) from the reaction products to a manifold, channel or container for collecting the filtered products, including directly to anode of fuel cell mounted directly on top of the microreactor. In such an embodiment, the hydrogen separating membrane 700 may be either Pd-alloy membrane or a mixed ionic electronic conductor (MIEC) membrane, or other material of similar general functionality. The hydrogen separating membrane 700 may further be integrated with a cover plate 630 for fitting the hydrogen separating membrane 700 in operative communication with the internal reactor channels 606.

The planar design depicted in FIG. 17 offers the following positive attributes. It readily allows for the stacking of similar parallel units for increasing hydrogen production capabilities. There is a dramatic reduction in required ductwork or piping for fluid handling and a substantial elimination of the need for auxiliary components for pumping, heating and the like, due to advantageous use of internal pressure drops and advantageous placement of its subcomponents to provide reheating from reaction products. In certain embodiments, though, some additional heating/insulation elements may be provided. In addition, highly reflecting scaffold (not shown), may likewise be used to reduce radiation losses from the micro-reactor 600.

It is readily contemplated that the micro-reactor 600 may be operated by unidirectional flow and/or or reverse-flow mode. Experimentation has revealed that reactor selectivity in the range of 65-70% and conversion of 50-55% can be achieved for unidirectional auto-thermal conversion of methane to hydrogen with very little carbon monoxide (CO) content in the product stream. Further increase in the hydrogen yield could achieve through recycling of-the product stream. The auto-thermal state was very stable for many hours of continuous operation even when small fluctuations were present in the reactor feed composition.

For reverse-flow auto-thermal operation, however, about a 7-10% increase in the hydrogen selectivity was achieved over unidirectional operation, while maintaining the same rate of conversion (Tables 1a and 1b). Experimentation has revealed that imposing flow reversal over the catalyst also allowed for a decrease of the reaction ignition temperature by as much as 200° C., which is essential for the efficient start-up of a cold micro-reactor 600. Both unidirectional and reverse-flow micro-reactors featured very low (about 30-40° C.) reactor "skin" temperature as long as they operated in an auto-thermal mode. This is because the distance and time that the heat produced from exothermic oxidation reaction must travel before it is consumed by the endothermic steam reforming reaction is minimized, as both reactions essentially occur on the same catalyst grain.

Unidirectional flow is readily accomplished with various existing chemical reactor designs. However, three alternative designs for the reverse-flow micro-reactors will now be disclosed.

Ideally, the valves of any reverse-flow micro-reactor 600 will exhibit the following properties. The flow-reversal valves should have a dead volume that is as small as possible (ideally zero), in order to minimize the cross-talk between the un-reacted reagents and reaction products immediately after flow reversal. This will significantly reduce or eliminate the need to purge the micro-reactor 600. The valve(s) must be amenable for simple, low-power actuation to ensure overall system effectiveness and energy efficiency. The number of connecting pipes and manifolds should be reduced to a minimum or, ideally, eliminated all together for minimizing cost of production and simplifying operation. Finally, the mixing chambers 400 and reaction channel 606 should be placed in optimal locations to achieve additional functionality. For example, waste heat generated in the reaction channel 606 may be used to preheat the reagents in the mixing chamber 400, which results in increased energy efficiency and enhanced reagent mixing of the micro-reactor 600.

EXAMPLE 1

Figure 18:
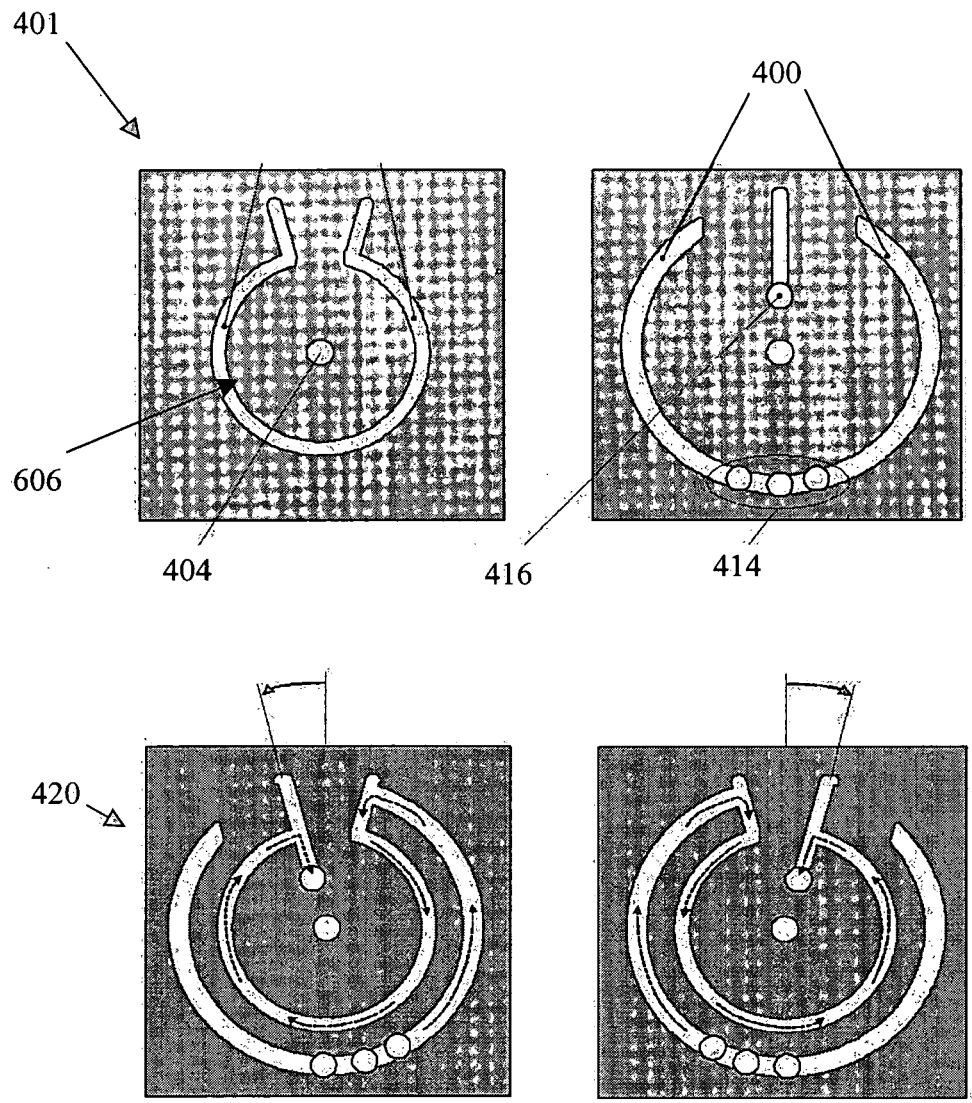
FIG. 18 is an illustration of a rotating plate micro-reactor according to various embodiments of the present disclosure.

FIG. 18 illustrates a rotating embodiment 401 of a reverse-flow micro-reactor 600 that permits efficient integration (i.e., without any additional pipes or connecting manifolds) of a mixing chamber 400, a zero-dead-volume rotating valve 404, and reaction channels 606. In this embodiment, flow reversal is accomplished by rotating (using a motor or the like) the mixing chamber 400 over a small angle about a fixed pivotal axis 404 (that may also be used for securing the micro-reactor assembly), thereby sequentially connecting the reaction channel 606 to the left and right sides of the mixing chamber 400. The mixing chamber 400 may be rotated between a first position 420 and a second position 422. When in the first position 420, the reagent inlet ports 414 and the product exit port 416 are biased to allow flow of reagents in a first direction along the deposited catalysts in the reaction channels 606. Conversely, when in the first position 420, the reagent inlet ports 414 and the product exit port 416 are biased to allow flow of reagents in a-second direction, substantially opposite to the first direction.

It should be noted that the reaction channels 606 may be placed substantially near, but not inside, the mixing chamber 400 to use the heat escaping the reaction chamber 702 in a radially outward direction for reagent preheating in the mixing chamber 400. Although single circular channels are shown for the mixing chamber 400 and the reaction channel 606 in FIG. 18, these channels can be made as complex as one wishes (e.g., a spiral or a Swiss roll configuration) to increase contact area and/or reagent residence time.

Small leakages of reagents across the contact plane of the mixing chamber 400 and the reaction channel 606 may be used as a lubrication layer for accommodating a smooth relative rotation of the two structures containing the mixing chamber 400 and the reaction channels 606. If needed, the leaked reagents can be also collected and recycled back into the reaction channels 606 to further increase the reaction yield.

Leakage can be further minimized by carefully polishing the contact surfaces of the structures containing the mixer 400 and reaction channels 606 or by using an intermediate thin separating plates (not shown) that may be firmly attached (cemented) to the mixer 400 and the reaction channels 606.

Further, the hydrogen separating membrane may be used to selectively transport or filter hydrogen (or other desired compound) from the reaction products to a manifold, channel, or container for collecting the filtered products, including directly to anode of fuel cell mounted directly on top of the microreactor. The hydrogen separating membrane may further be integrated with the mixing chamber 400 for placing it in operative communication with the internal reactor channels 606. In such an embodiment, the hydrogen separating membrane may be a Pd-alloy membrane or a mixed ionic electronic conductor (MIEC) membrane, or other material of similar general functionality, for example.

EXAMPLE 2

Figure 19:
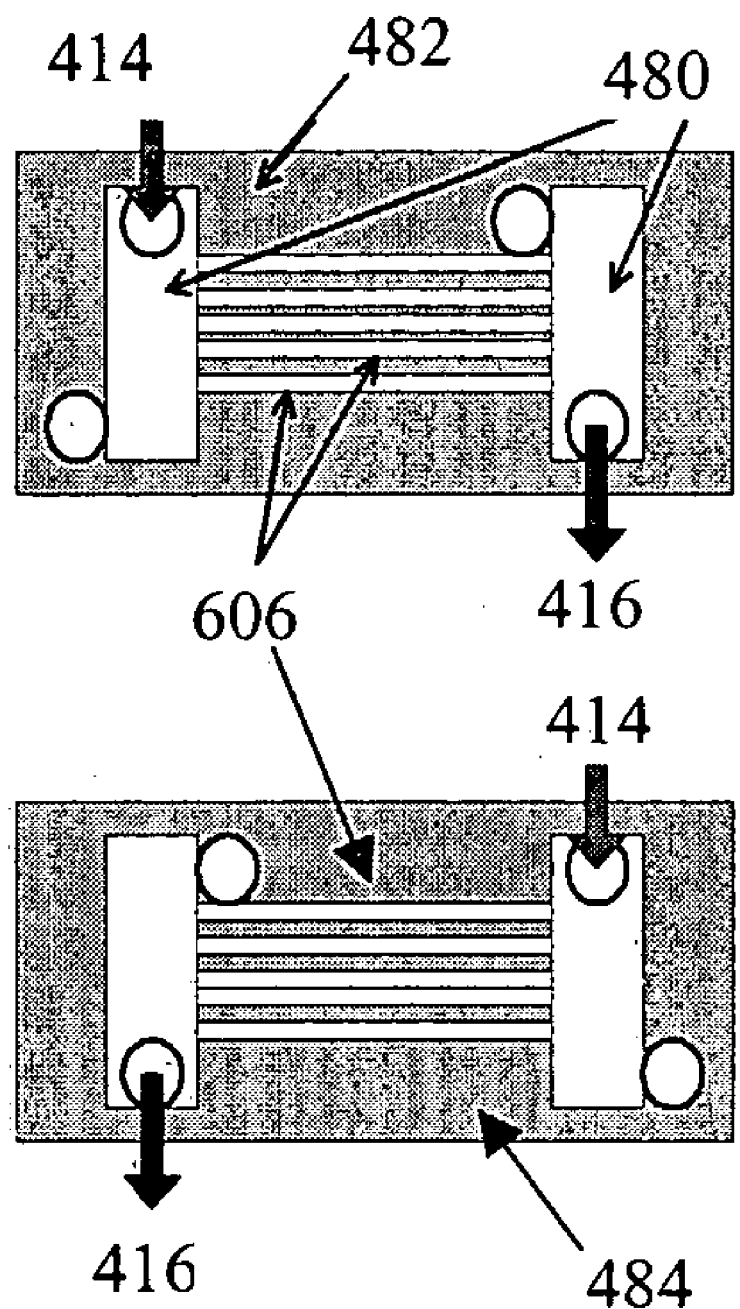
FIG. 19 is an illustration of a sliding plate micro-reactor according to various embodiments of the present disclosure.
Figure 20:
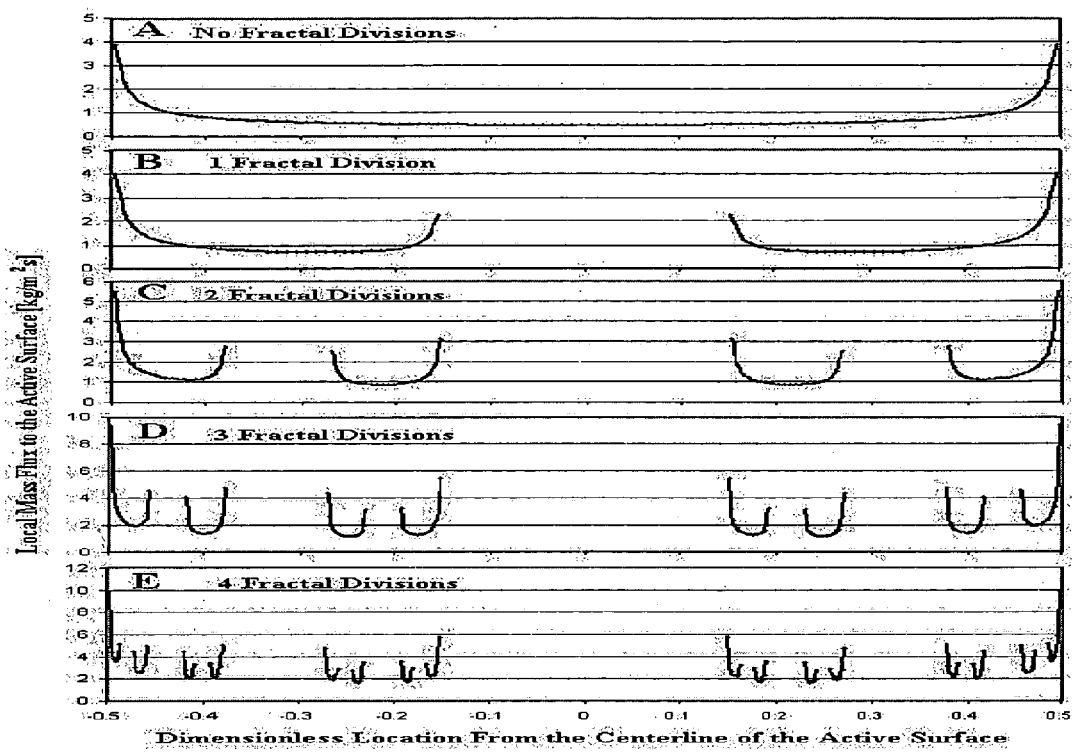
FIGS. 20-22 are graphs showing the effect of the fractal pattern for catalyst deposition in the channels on enhancement of the local mass fluxes and the rates of mass transfer.

A third embodiment of the reverse-flow micro-reactor 600 is shown in FIG. 19. In this embodiment, flow reversal may also be accomplished by the micro-reactor 600 in a valveless fashion by placing one or more suitable cover plates 482 and 484 having inlet ports 414 and outlet ports 416 for establishing the flow direction. The cover plates 482 and 484 may internally incorporate the mixing chambers 480, which are disposed to communicate with the reaction channels 606. In this embodiment, the absence of valves, and thus of dead volume associated with valves, simplifies actuation by allowing use of a linear motor or any other actuator (not shown) to move the cover plates 482 relative to the base plate 484 containing the reaction channels 606. The cover plates may be moved successively in a first position 482 and a second position 484, in order to bias reagent flow in a first or a second direction, respectively, along the reaction channels 606. This embodiment substantially eliminates reactor purging steps necessitated by reagent-to-product cross-talk in existing systems. The bottom reactor plate with the catalyst channels and the top (valve) plate may be further separated by an intermediate plate with appropriate openings and seal for leakage prevention It should be noted the disclosed embodiments 1 and 2 for valves-less reverse-flow operation can be used not only for hydrogen production, but also for executing any other chemical reactions that can benefit from the reverse-flow operation (see, for example, Matros, Y. S, *Catalytic Processes Under Unsteady-State Conditions*, Elsevier, New York, 1989 and Matros, Y. S. "A Review: forced unsteady-state processes in heterogeneous catalytic reactors", *Canadian Journal of Chemical Engineering*, 74, p. 566 (1996).). Also, the reverse-flow operation is commonly used for reagent mixing and flow control in bioanalytical instruments (e.g., gas chromatography) and applications.

4.3 Examples: Experimental Results From Reactor Operation

Detailed experimental studies of both partial oxidation and steam reforming of methane and methanol fuels were undertaken for tubular and rotating micro-reactor designs. Data was collected for reactor performance (reaction conversion and selectivity towards hydrogen) for a wide range of operating temperatures, total flow rate of reagents (expressed in terms of residence time or gas hourly space velocity (GHSV)), and feed compositions (e.g. methane-to-water ratios ($CH_4:O_2:H_2O$)). Further details on the experimental conditions are given in Kikas, T., Bardenshteyn, I., Williamson, C., Ejimofor, C. Puri, P., and Fedorov, A. G., Hydrogen production in the reverse-flow autothermal catalytic microreactor, Proceedings of the *Seventh International Conference on Microreaction Technology* (IMRET), Lausanne, Switzerland (Sep. 7-10, 2003) and Kikas, T., Bardenshteyn, I., Williamson, C., Ejimofor, C., Puri, P., and Fedorov, A., 2003, "Hydrogen Production in the Reverse-Flow Autothermal Catalytic Microreactor: From Evidence of Performance Enhancement to Innovative Reactor Design", *Industrial & Engineering Chemistry Research*, Vol. 42, pp. 6273-6279, which in corporated herein by reference.

The detailed studies of these micro-reactor processes clearly demonstrate that by properly selecting the feed composition, the full oxidation process could provide heat and water needed for the steam-reforming process without requiring external heating. Some water may be required to be added to the feed mixture for better temperature control of the micro-reactor 600, for example, by providing water for reaction quenching in order to avoid thermal runaway in the micro-reactor 600.

4.4 Fractal Deposition of Catalysts

Turning now to FIGS. 20-23, certain features of catalytic deposition along the reaction channel(s) 606 of the micro-reactor 600 will now be disclosed. A major factor in the cost of assembly of a micro-reactor 600 is the cost of catalyst materials that need to be deposited on the internal channels 606 to achieve desired level of chemical conversion. Previous attempts to reduce this cost have focused on replacing noble metals such as Pt, Pd, Rh with cheaper alternatives, such as copper or other alloys featuring high catalytic activity. The catalyst load is typically uniformly deposited on an internal surface of the reaction channels 606. However, the active surface and hence the catalyst loading can be drastically reduced, while the conversion rate remains essentially unchanged, by using discontinuous catalyst deposition pattern such as fractals, for example, for spatial distribution of the catalyst load. A significant reduction in cost of heterogeneous diffusion-limited reaction micro-systems can thus be achieved through such fractal deposition, due to lower required amounts of catalyst deposition.

The results are most significant for micro-reactors 600 in which the flow is characterized by a very low Peclet (Pe) number. For example, our simulations indicate 75% reduction in the catalyst loading (cost) can be achieved with only 4% loss in the rate of chemical conversion as long as Pe<1. These results counter intuition by indicating that the active surface of heterogeneous, diffusion-limited reaction systems can be reduced significantly while maintaining essentially the same rate of chemical conversion. Mathematically, this result owes to optimal placement of singularities in the boundary conditions at points on the reaction channel(s) 606 where the active surface meets the inactive surface. The local mass flux approaches asymptotically to infinity near these singularities, thereby establishing a mechanism for conserving the total rate of chemical conversion despite significant reduction in the catalytically active surface area.

Figure 21:
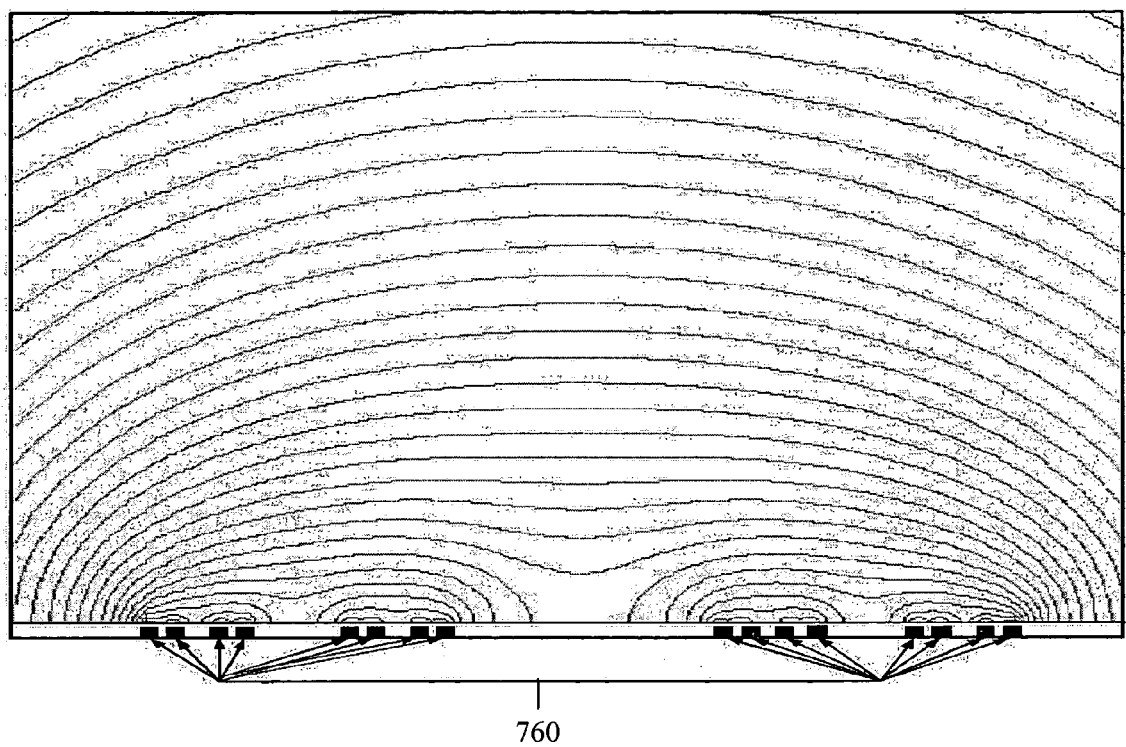
Figure 22:
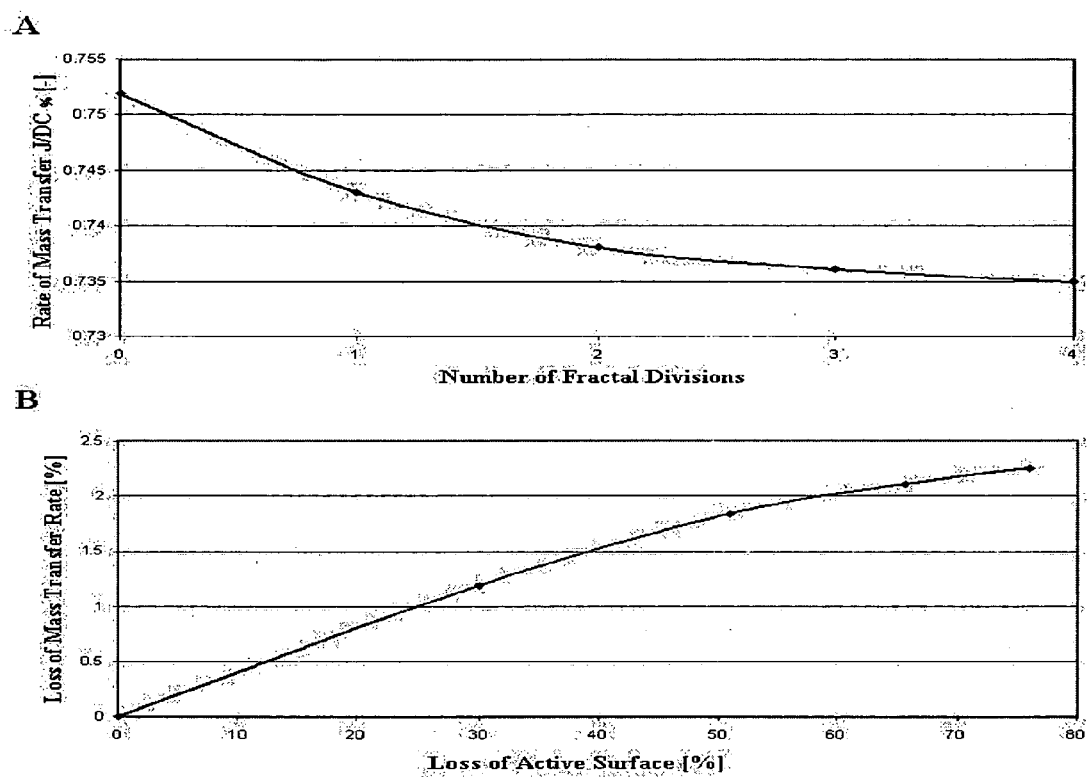
Figure 23:
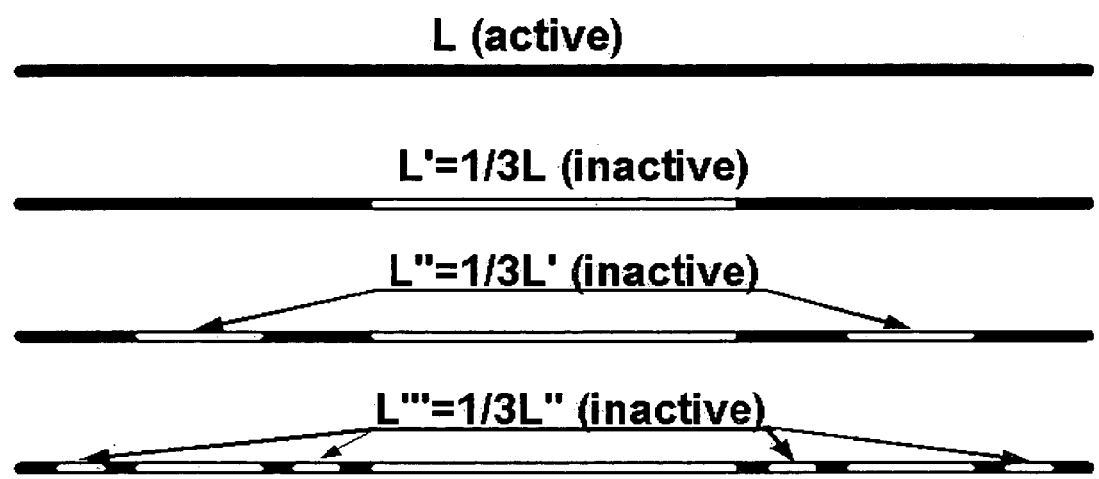
FIG. 23 is an illustration of one possible linear (one-dimensional) fractal distribution patterns for catalysts in a micro-reactor.

One process for achieving fractal distribution of a catalyst is now described, as an example only, as other distributions following the fundamental principles we established can be conceived. A given portion from the center of each segment of active surface is removed repeatedly, thus ,reducing the surface towards zero and consistently adding more singularities into the boundary conditions. This configuration is known as a Cantor set, the first four fractal iterations of which are shown in FIG. 23. As seen in FIG. 21, the iso-lines (lines of constant concentration) are significantly disturbed (become spaced much denser) by the introduced singularities 760 very close to the active surface. This readily demonstrates the mass transfer enhancement when fractal structuring of the active surface is used. Simulations indicate that introduction of periodic singularities into the boundary conditions through fractal structuring of the active surface of the membrane 700 allows a 76% reduction in the catalyst loading while losing only 2.25% of the original rate of chemical conversion, as demonstrated by the graphs in FIG. 22, where the effect of the fractal-based reduction of the catalyst loading on the rate of mass transfer and its percentage loss are shown.

The effect of fractal structuring of the active surface is the most profound for micro-or nano-scale systems, for which the Peclet and Rayleigh numbers are intrinsically small due to their small characteristic length and scale. Similar results were obtained for the mass transfer enhancement in the presence of natural convection, for which the relative importance of convection as compared to diffusion is given by the Rayleigh number (Ra). The total rate of mass transfer was reduced by only 10% for a 76% drop in the active surface by fractal structuring when Ra=1 (i.e., weak natural convection transport) and by about 20% in the convection dominated situation characterized by the larger Rayleigh number of 1000.

Further details are available in Phillips, C., Ben-Richou, A., Ambari, A., and Fedorov, A., "Catalyst surface at a fractal of cost—A quest for optimal catalyst loading", *Chem. Eng. Sci.*, 58 (11), 2403 (2003), which is incorporated herein by reference.

4.5. Integrated System

FIGS. 24-28 show particular embodiments of an assembled integrated system 100 and its components. FIG. 24 is a side-view of a schematic of the integrated system 100 featuring a micro-reactor 600, an atomizer 500 including an integrated piezo-electric device 510, and a membrane 700 for hydrogen separation from the product stream. The pressure drop 660 along the reaction channel(s) 606 is utilized for in-situ membrane separation featuring locally optimal conditions for both hydrogen separation (due to high temperature and pressure differential across the membrane) and hydrogen production (due to a shift in the reaction equilibrium towards more $H_2$).

Figure 25:
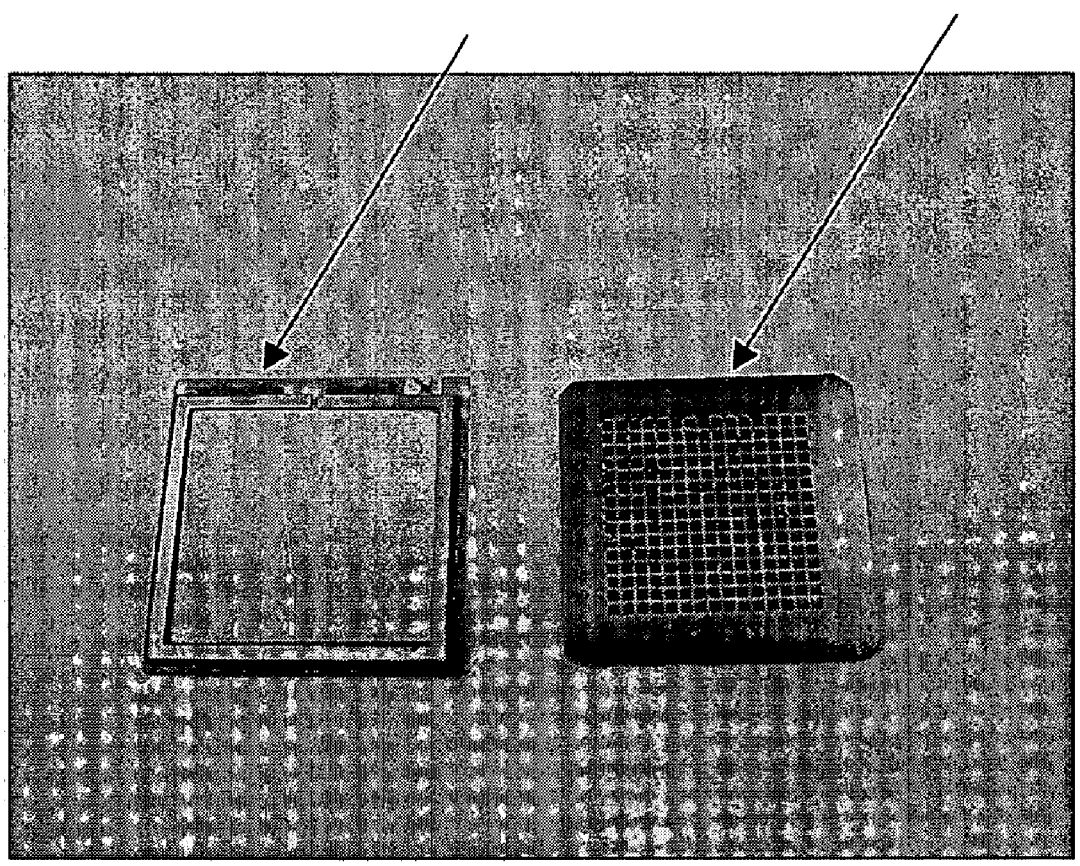
FIG. 25 displays an assembled fluid reservoir space and ejector nozzle array according to certain embodiments of the present disclosure.

FIG. 25 depicts a manufactured fluid reservoir 550 and a matrix of ejectors 535.

Figure 26:
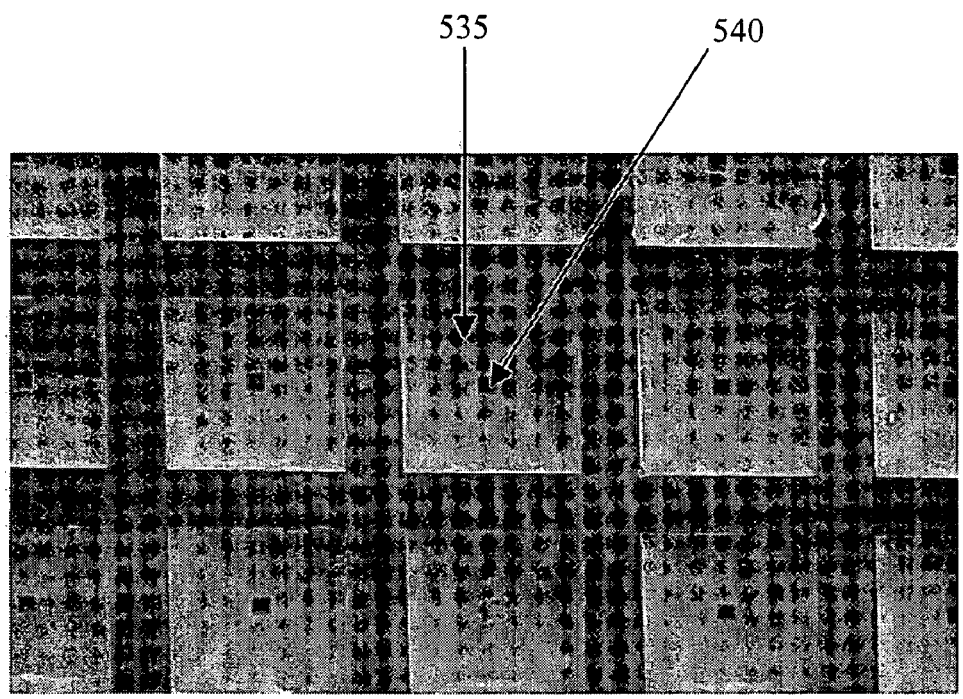
FIG. 26 displays a matrix of ejector nozzles according to certain embodiments of the present disclosure.
Figure 27:
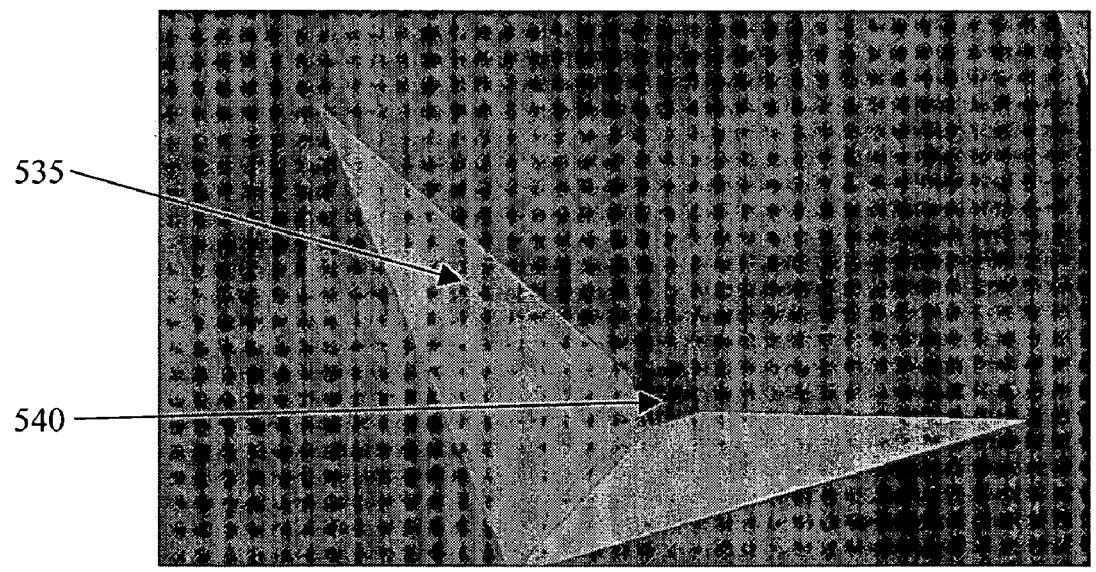
FIG. 27 displays an etched acoustical horn structure for an ejector nozzle according to certain embodiments of the present disclosure.
Figure 28:
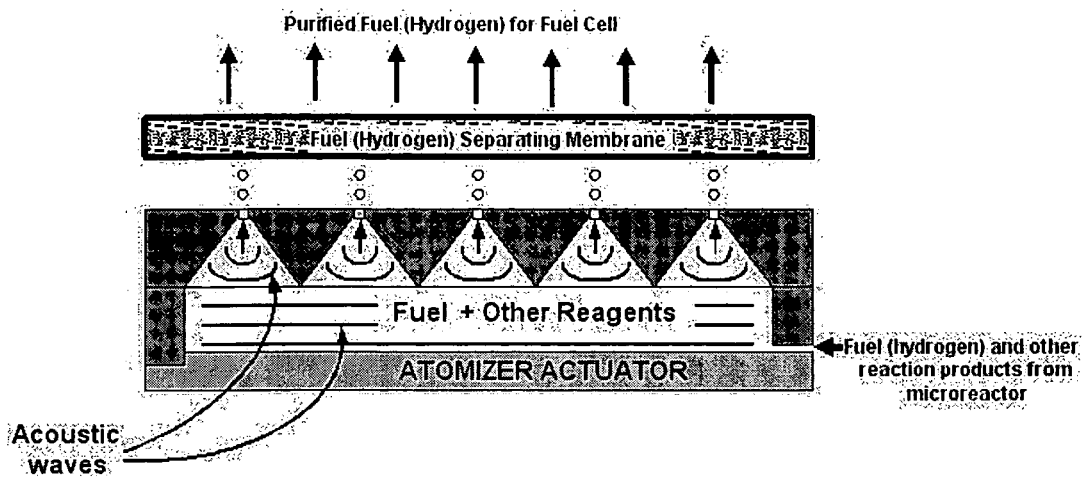
FIG. 28 is an illustration of an atomizer directly integrated with a membrane.
Figure 29:
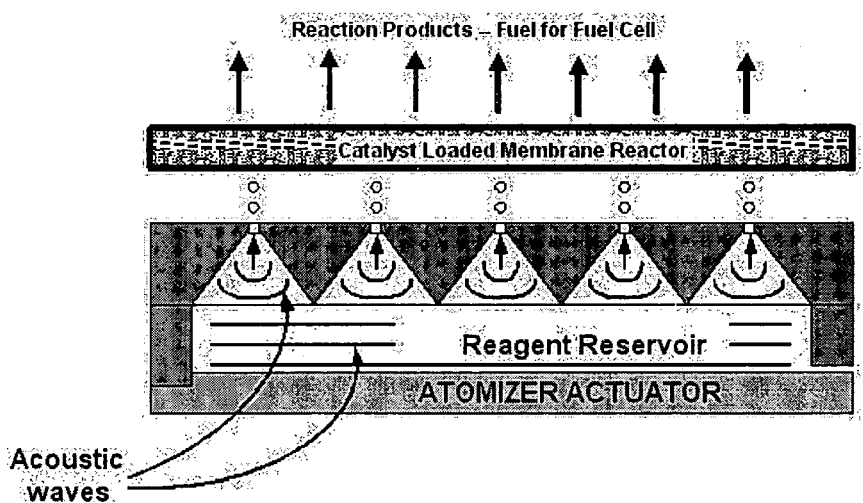
FIG. 29 is an illustration of an atomizer integrated with a catalytic membrane reactor.
Figure 30:
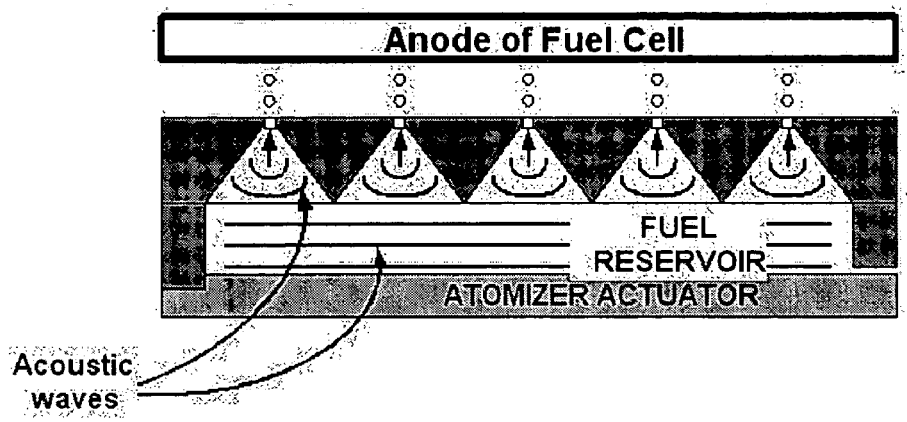
FIG. 30 is an illustration of an atomizer integrated directly with a fuel cell.
Figure 31:
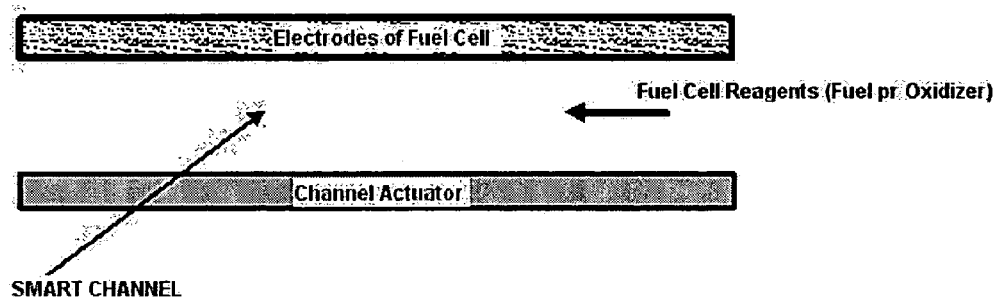
FIG. 31 is an illustration of smart channels integrated with a fuel cell.

FIG. 26 depicts a scanning electron microscope (SEM) micrograph of the pyramidal structure of a matrix of ejectors 535 obtained via KOH-etch, with the nozzle 540 measuring approximately 15 μm. FIG. 27 depicts an SEM micrograph of a single ejector 535.

Figure 32:
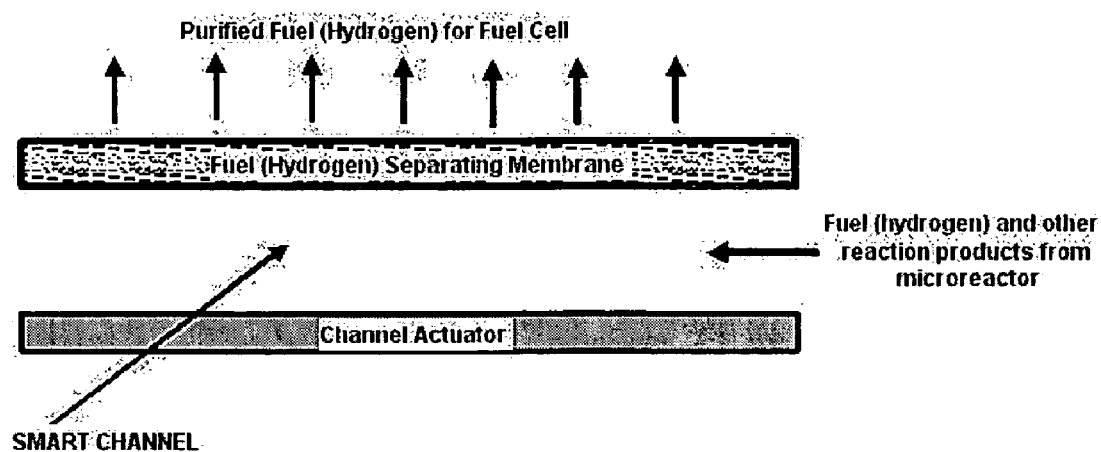
FIG. 32 is an illustration of smart channels integrated with a membrane.

In addition, other embodiments can be envisioned based on various combination described system components (i.e., an atomizer, smart channels, a membrane, and a microreactor). It includes, for example, an atomizer directly integrated with the hydrogen separating membrane (FIG. 28), an atomizer integrated with the catalytic membrane reactor (FIG. 29), an atomizer integrated directly with a fuel cell to supply fuel (FIG. 30), smart channels integrated with the fuel cell (FIG. 31), and. smart channels integrated with the hydrogen separating membrane (FIG. 32).

4.6 Microreactor Manufacturing

Figure 33:
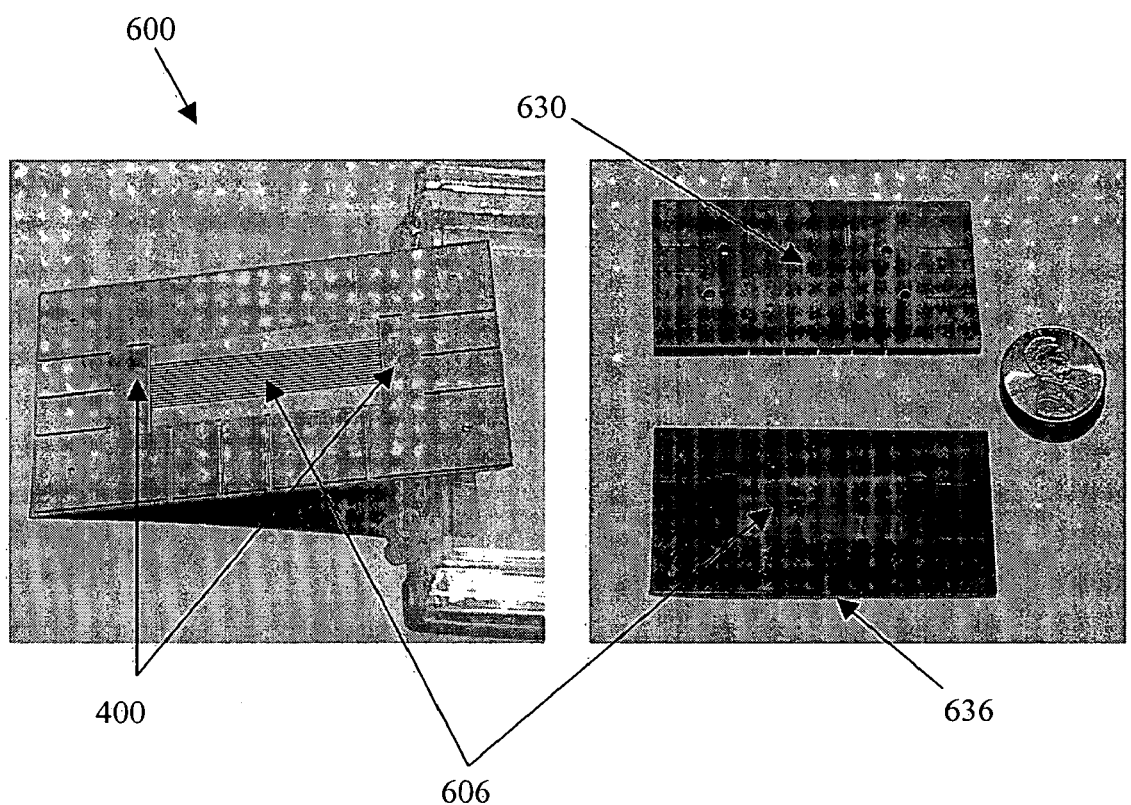
FIG. 33 displays silicon micromachined components of the planar reactor with internal mixing chambers and internal channels according to certain embodiments of the present disclosure.

Briefly, a procedure for fabricating the components of the micro-reactor 600, as shown in FIG. 33 is as follows. Sequential photoresist spin-coating is performed on a silicon wafer. Lithography techniques are then used to define the reaction channels 606 and the mixing chamber 400 on the bottom plate 636 and connection through-holes on the top plate 630. Cured photoresist is then removed using a developer solution (AZ 400K Developer). ICP-etching of the exposed areas is then performed to produce the reaction channels 606, the mixing chambers 400, and through-holes in the cover plate 630. The wafer is then cleaned using acetone, and, finally, -the reactor plates 630, 636 are cut to a proper size. The catalysts (Pt in this case) are then deposited on the interior surface of interior channels 606 using either a DC-sputterer or an electron beam evaporator combined with shadow masking to deposit catalyst in pre-defined places only. A hydrogen separating membrane 700 (for example, Pd-alloy) integrated with a porous silicon substrate may readily be used in the disclosed system 100.

Although the best methodologies of this disclosure have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined solely by the appended claims.

What is claimed is:

1. An atomizer, comprising:
   a first reservoir for receiving a fluid;
   an atomizer actuator disposed in communication with the first reservoir for generating an acoustical pressure wave through the fluid; and
   a first set of ejectors including at least one ejector for dispensing atomized fluid in response to the acoustical pressure wave.

2. The atomizer of claim 1, further comprising:
   a reactor selected from a reverse-flow micro-reactor and a unidirectional-flow micro-reactor.

3. The atomizer of claim 1, wherein the atomizer actuator is selected from a piezoelectric actuator and a capacitive actuator.

4. The atomizer of claim 3, wherein the atomizer actuator operates in a range from about 100 kHz to 100 MHz.

5. The atomizer of claim 1, wherein the ejector has a structure for focusing acoustic waves, and wherein the structure is selected from a horn structure and a pyramidal structure.

6. The atomizer of claim 1, further comprising:
   a second reservoir for receiving the fluid, the atomizer actuator disposed in communication with the first reservoir for generating an acoustical pressure wave through the fluid in the first reservoir and second reservoir; and
   a second set of ejectors including at least one ejector for dispensing atomized fluid in response to the acoustical pressure wave disposed, wherein the second set of ejectors is disposed on opposite side of the atomizer actuator as the first set of ejectors.

7. The atomizer of claim 1, further comprising at least two sets of ejectors and at least two atomizer actuators for activating the at least two ejector nozzles.

8. The atomizer of claim 1, further comprising at least two atomizers.

9. The atomizer of claim 8, further comprising a pressure sensor for controlling each atomizer.

10. The atomizer of claim 1, wherein the atomizer having at least one set of ejectors disposed on opposing sides of the atomizer actuator.

11. The atomizer of claim 1, wherein the at least one ejector nozzle further comprising a structure for focusing an acoustic wave at a tip of the at least one ejector nozzle.

12. The atomizer of claim 11, wherein the structure selected from a horn structure and a pyramidal structure.

13. The atomizer of claim 12, wherein the horn structure having an internal cavity that expands from a tip according to at least one function selected from a linear function and an exponential function.

14. The atomizer of claim 11, wherein the structure formed by at least one of chemical etching and physical machining of a solid substrate.

15. The atomizer of claim 1, wherein each of the at least one ejector nozzles being individually activated.

16. The atomizer of claim 1, wherein the at least one ejector nozzle having a tip through which an opening may be formed.

17. The atomizer of claim 1, further comprising a fuel cell.

18. The atomizer of claim 17, wherein the atomizer and the fuel cell are directly integrated.

19. The atomizer of claim 1, further comprising:
a storage reservoir for storing the fluid.

20. The atomizer of claim 19, wherein the storage reservoir comprising a separate reservoir for delivering the fluid to the atomizer.

21. The atomizer of claim 20, wherein the separate reservoir is selected from a disposable cartridge and a refillable cartridge.

22. The atomizer of claim 20, wherein the separate reservoir comprising a pressurized cartridge for storing the fluid in a pressurized environment.

23. The atomizer of claim 22, wherein the atomizer controls a pressure of the pressurized cartridge using the atomizer actuator.

24. The atomizer of claim 1, wherein the fluid is selected from a liquid, a gas, a fluidized polymer, liquid with solid particles, a gas with solid particles, and combinations thereof.

25. The apparatus of claim 1, wherein the atomizer is integrated with a membrane in the reactor.

* * * * *